(12) United States Patent
Rotella et al.

(10) Patent No.: US 8,868,461 B2
(45) Date of Patent: Oct. 21, 2014

(54) ELECTRONIC TRADING PLATFORM AND METHOD THEREOF

(71) Applicant: Miami International Securities Exchange, LLC, Princeton, NJ (US)

(72) Inventors: Matthew Rotella, Edgemont, PA (US); David Blackman, Elkins Park, PA (US); Oleksandr Brezitskyy, Lansdale, PA (US); Paul Fost, Pound Ridge, NY (US); Bharat Karia, Edison, NJ (US); Anatoly Khusid, Cherry Hill, NJ (US); David Lehmann, Lumberton, NJ (US); Matthew Mintel, Williamstown, NJ (US); Kevin Mueller, Yardley, PA (US); Vinay Rao, Collegeville, PA (US); Douglas Schafer, Rose Valley, PA (US); Ilya Shnayder, Milltown, NJ (US); Muna Tang, Dayton, NJ (US)

(73) Assignee: Miami International Securities Exchange, LLC, Princeton, NJ (US)

(*) Notice: Subject to any disclaimer, the term of this patent is extended or adjusted under 35 U.S.C. 154(b) by 0 days.

(21) Appl. No.: 14/098,882

(22) Filed: Dec. 6, 2013

(65) Prior Publication Data

US 2014/0164207 A1 Jun. 12, 2014

Related U.S. Application Data

(60) Provisional application No. 61/734,204, filed on Dec. 6, 2012.

(51) Int. Cl.
*G06Q 40/00* (2012.01)
*G06Q 40/04* (2012.01)

(52) U.S. Cl.
CPC ................................ *G06Q 40/04* (2013.01)
USPC ........................................................ 705/37

(58) Field of Classification Search
CPC .................................................. G06Q 40/04
USPC ........................................................ 705/37
See application file for complete search history.

(56) References Cited

U.S. PATENT DOCUMENTS

| 8,266,044 | B2 | 9/2012 | Kaminsky et al. | |
| 2008/0320194 | A1* | 12/2008 | Vega et al. | 710/263 |
| 2010/0268632 | A1* | 10/2010 | Rosenthal | 705/37 |
| 2010/0293110 | A1* | 11/2010 | Rosenthal et al. | 705/36 R |

(Continued)

OTHER PUBLICATIONS

Risca et al., "Trading Floor Architecture," Cisco, 2008 (http:/www.cisco.com/en/US/docs/solutions/Verticals/Trading_Floor_Architecture-E.pdf) (37 pages).

*Primary Examiner* — Thomas M Hammond, III
(74) *Attorney, Agent, or Firm* — Cozen O'Connor

(57) ABSTRACT

An electronic trading platform performs trading of one or more types of financial instruments and includes at least one cloud providing at least one independent trading environment executed by a server. The at least one cloud includes a plurality of instances of an express interface application executed by the server and configured to receive interests in the financial instruments. The plurality of instances of the express interface application are configured to write the interests to a shared memory on the server. A matching engine, executed by the server, is configured to continuously poll the shared memory, read the interests written by the plurality of instances of the express interface application, analyze the read interests to determine if there is a matching contraside interest and allocate matching interests based on at least one allocation rule.

26 Claims, 16 Drawing Sheets

(56) References Cited

U.S. PATENT DOCUMENTS

| | | | |
|---|---|---|---|
| 2011/0238555 A1* | 9/2011 | Rosenthal | 705/37 |
| 2012/0020251 A1 | 1/2012 | Sundararaman et al. | |
| 2012/0246052 A1* | 9/2012 | Taylor et al. | 705/37 |
| 2013/0024875 A1* | 1/2013 | Wang et al. | 719/318 |
| 2013/0191265 A1* | 7/2013 | Nanwani | 705/37 |
| 2014/0006251 A1* | 1/2014 | Lundberg et al. | 705/37 |
| 2014/0047456 A1* | 2/2014 | Haba | 719/312 |
| 2014/0101074 A1* | 4/2014 | Schonberg et al. | 705/36 R |
| 2014/0122314 A1* | 5/2014 | Gottemoller et al. | 705/37 |

* cited by examiner

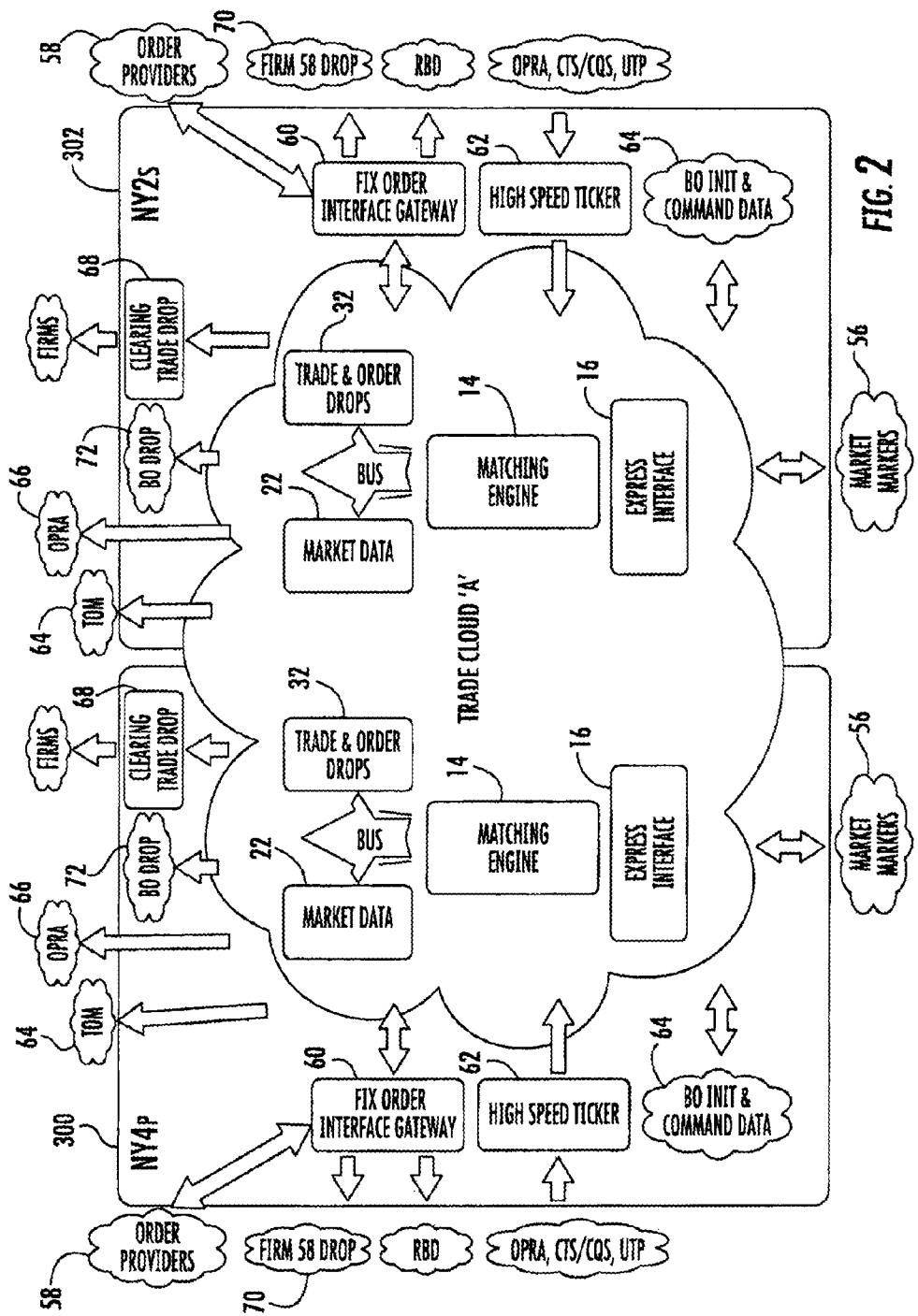

ELECTRONIC TRADING PLATFORM AND METHOD THEREOF

CROSS-REFERENCE TO RELATED APPLICATION

This application claims benefit of U.S. Provisional Patent Application 61/734,204, filed Dec. 6, 2012, the entirety of which is hereby incorporated by reference.

FIELD OF INVENTION

The present invention is directed to a system architecture and method thereof and, in particular to a system architecture and method thereof for supporting the complex business logic, scalability and ultra-low latency demands of an equity and derivatives environment while minimizing the size of a data center footprint.

BACKGROUND OF THE INVENTION

Conventional trading platforms face increasing functional and performance demands. A trading platform with proper protections, latency, and throughput is essential to the success of the trading community.

Conventional trading platforms are lacking in areas of performance and scalability, customer interfaces, testing to ensure high reliability, monitoring and systems security, architecture that minimizes demands on power, space, and cooling while allowing for rapid scalability, resiliency and fault isolation and Disaster Recovery.

SUMMARY OF THE INVENTION

It is an object of the present invention to meet desired performance metrics by providing a hardware and software architecture that combine to provide ultra-low latency and scalable throughput.

It is an object of the present invention to provide performance monitoring tools to support comprehensive monitoring of production activity.

It is an object of the present invention to provide an electronic trading platform having an architecture for high resiliency and narrow fault isolation.

It is an object of the present invention to provide a flexible architecture to facilitate customization for trading Options, Equities and Futures.

It is an object of the present invention to centralize business logic to simplify implementation and improve testability of an electronic trading platform.

It is an object of the present invention to leverage commercial off-the-shelf equipment with higher numbers of cores to reduce server count of an electronic trading platform.

It is an object of the present invention to provide an architecture that simplifies and streamlines system operation.

According to one aspect of the present application, a method is provided for trading quotes relating to financial instruments received from quoting firms in a computerized trading system having a plurality of independent trading environments, each of the independent trading environments having (i) a communication network, (ii) a matching engine executed by a server, and (iii) plural instances of an express interface application executed by the server, each express interface application being associated with a particular quoting firm, wherein trading in the financial instruments is divided among the independent trading environments on the basis of symbols associated with the traded financial instruments and each independent trading environment is configured to process quotes from one or more trading symbols out of all the trading symbols tradable on the trading system. The method comprises: receiving quotes from a particular quoting firm at each express interface application; placing, by the express interface applications, the quotes received from the respective quoting firms in areas of a shared memory each reserved for quotes from a particular respective one of the quoting firms; polling, by the matching engine, the areas of the shared memory in a round-robin manner, such that, when the matching engine finds a quote or quotes in an area of the shared memory, the matching engine completes processing of the quote or quotes in the area before polling a next area of the shared memory; and the matching engine, upon completion of polling all areas of the shared memory, checking a network port of the matching engine to service messages received over the network, before repeating the polling of the shared memory areas for quotes.

In another aspect, the messages received by the matching engine over the network comprise orders from FIX order interface.

In another aspect, the method further comprises the matching engine, after processing a quote or quotes in an area of the shared memory, sending over the network, using a multicast protocol, information relating to the processing of the quote.

In another aspect, the matching engine sends the information relating to the processing of the quote to a high bandwidth bus of the independent trading environment.

In another aspect, the independent trading environment includes applications configured to forward top of the market data, based on the processing of the quotes, to parties outside of the independent trading environment.

In another aspect, the parties outside the independent trading environment include OPRA.

In another aspect, the independent trading environment includes a message retrieval application that records all messages sent between the matching engine and applications present in the independent trading environment, the method further comprising: in response to a request from an application to fill a gap in messages, the message retrieval application provides the requesting application with the messages necessary to fill the gap.

In another aspect, the method further comprises the matching engine receiving, from data sources outside of the trading system, market data, and modifying processing of the quotes on the basis of the received market data.

In another aspect, the processing of the quote or quotes includes the matching engine determining if there is a matching contraside interest and allocating matching interests according to at least one allocation rule.

In accordance with another aspect of the present invention, a computerized electronic trading platform is provided for performing trading of one or more types of financial instruments. The trading platform comprises: a plurality of independent trading environment executed by a server, each independent trading environment including: (i) a plurality of instances of an express interface application executed by the server and configured to receive interests in the financial instruments, the plurality of instances of the express interface application configured to write the interests to a shared memory on the server; and (ii) a matching engine executed by the server and configured to continuously poll the shared memory, read the interests written by the plurality of instances of the express interface application, analyze the read interests to determine if there is a matching contraside interest and allocate matching interests based on at least one allocation rule.

In another aspect, the plural instances of the express interface application are each associated with a particular quoting firm, and trading in the financial instruments is divided among the independent trading environments on the basis of symbols associated with the traded financial instruments, each express interface application is configured to receive quotes from a particular quoting firm, and each independent trading environment is configured to process quotes from one or more trading symbols out of all the trading symbols tradable on the trading system, the express interface applications is configured to place quotes received from respective quoting firms in areas of a shared memory each reserved for quotes from a particular respective one of the quoting firms; and the matching engine is configured to poll the areas of the shared memory in a round-robin manner, such that, when the matching engine finds a quote or quotes in an area of the shared memory, the matching engine completes processing of the quote or quotes in the area before polling a next area of the shared memory.

In another aspect, the matching engine is configured to, upon completion of polling all areas of the shared memory, check a network port of the matching engine to service messages received over the network, before again polling the first area of the shared memory for quotes.

In another aspect, the messages received by the matching engine over the network comprise orders from FIX order interface.

In another aspect, the matching engine is configured, after processing a quote or quotes in an area of the shared memory, to send over the network, using a multicast protocol, information relating to the processing of the quote.

In another aspect, the matching engine is configured to send the information relating to the processing of the quote to a high bandwidth bus of the independent trading environment.

In another aspect, the independent trading environment includes applications configured to forward top of the market data, based on the processing of the quotes, to parties outside of the independent trading environment.

In another aspect, the parties outside the independent trading environment include OPRA.

In another aspect, the independent trading environment includes a message retrieval application that records all messages sent between the matching engine and applications present in the independent trading environment, wherein, in response to a request from an application to fill a gap in messages, the message retrieval application is configured to provide the requesting application with the messages necessary to fill the gap.

In another aspect, the matching engine is configured to receive, from data sources outside of the trading system, market data, and modifying processing of the quotes on the basis of the received market data.

In accordance with yet another aspect of the present invention, a non-transitory computer-readable medium stores instructions for execution by a processor to cause the processor to execute a method for trading quotes relating to financial instruments received from quoting firms in a computerized trading system having a plurality of independent trading environments, each of the independent trading environments having (i) a communication network, (ii) a matching engine executed by a server, and (iii) plural instances of an express interface application executed by the server, each express interface application being associated with a particular quoting firm, wherein trading in the financial instruments is divided among the independent trading environments on the basis of symbols associated with the traded financial instruments and each independent trading environment is configured to process quotes from one or more trading symbols out of all the trading symbols tradable on the trading system. The method comprises: receiving quotes from a particular quoting firm at each express interface application; placing, by the express interface applications, the quotes received from the respective quoting firms in areas of a shared memory each reserved for quotes from a particular respective one of the quoting firms; polling, by the matching engine, the areas of the shared memory in a round-robin manner, such that, when the matching engine finds a quote or quotes in an area of the shared memory, the matching engine completes processing of the quote or quotes in the area before polling a next area of the shared memory; and the matching engine, upon completion of polling all areas of the shared memory, checking a network port of the matching engine to service messages received over the network, before repeating the polling of the shared memory areas for quotes.

In another aspect, the messages received by the matching engine over the network comprise orders from FIX order interface.

In another aspect, the method further comprises the matching engine, after processing a quote or quotes in an area of the shared memory, sending over the network, using a multicast protocol, information relating to the processing of the quote.

In another aspect, the matching engine sends the information relating to the processing of the quote to a high bandwidth bus of the independent trading environment.

In another aspect, the independent trading environment includes applications configured to forward top of the market data, based on the processing of the quotes, to parties outside of the independent trading environment.

In another aspect, the parties outside the independent trading environment include OPRA.

In another aspect, the independent trading environment includes a message retrieval application that records all messages sent between the matching engine and applications present in the independent trading environment, the method further comprising: in response to a request from an application to fill a gap in messages, the message retrieval application provides the requesting application with the messages necessary to fill the gap.

In another aspect, the method further comprises the matching engine receiving, from data sources outside of the trading system, market data, and modifying processing of the quotes on the basis of the received market data.

In another aspect, the processing of the quote or quotes includes the matching engine determining if there is a matching contraside interest and allocating matching interests according to at least one allocation rule.

BRIEF DESCRIPTION OF THE DRAWINGS

The following description, given with respect to the attached drawings, may be better understood with reference to the non-limiting examples of the drawings, wherein:

FIG. 2 is a block diagram illustrating redundant components of a single cloud of an electronic trading platform according to an example embodiment;

DETAILED DESCRIPTION OF THE PREFERRED EMBODIMENTS

Figure 1A:
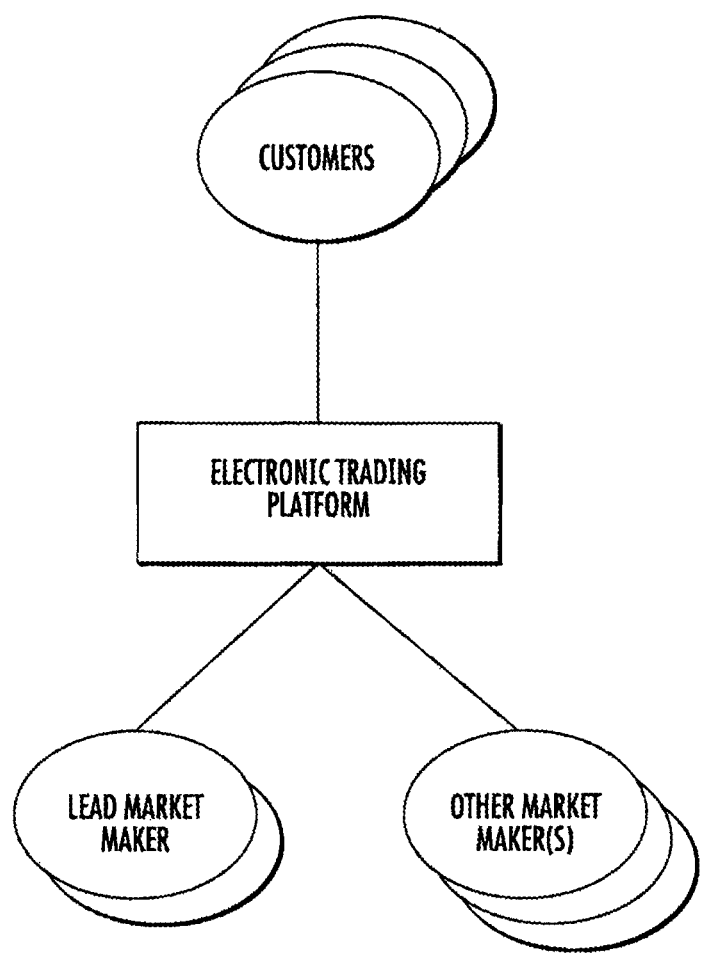
FIG. 1A is a block diagram of an electronic trading platform for providing trading among a number of trading participants according to an example embodiment.

FIG. 1A is a highly schematic diagram of an electronic trading platform that facilitates trades between a number of possible trading parties. An electronic trading platform may comprise a series of interconnected computers for communicating between the trading parties and a centralized computer system acting as the Exchange. The centralized computer system is preferably formed of at least one parallel processing computer that records the interactions between the trading parties and matches bids and offers as described more fully herein. The computer system includes at least one computer processor, digital computer memory and non-transitory non-volatile storage devices (e.g., hard disk drives, disk arrays, and/or EEPROM/Flash memory arrays). The computer system further includes computer code stored in the digital computer memory (potentially having been read from the non-volatile storage devices) for controlling the computer processor to perform steps defined by the computer code. The computer code controls the computer system to perform the processing described herein.

The components of the electronic trading platform are configured to perform trading of one or more types of financial instruments (e.g., equities or options). In one embodiment of the electronic trading platform, incoming interests (e.g., quotes and orders) in a tradable financial instrument are analyzed to determine if there is a matching contraside interest (e.g., an initiating (i.e., incoming) offer matching an existing (i.e., resting) bid or an initiating bid matching a resting offer for some number of contracts). If there are matching contraside interests resting, the system may perform automatic allocation of the interests according to, e.g., the trading rules of the system.

To meet the performance demands of the trading industry, an electronic trading system according to an example embodiment employs a number of architectural design techniques and various technologies described in greater detail below to provide ultra-low latency and high throughput performance.

To meet processing throughput and latency demands of the architectural objectives, an electronic trading system according to an example embodiment is componentized to create a distributed processing software system. That is, the logical processing of various tasks is localized into software components that allows for their distribution across multiple CPU's throughout the hardware platform. This componentization allows for parallel processing where the opportunity exists and, therefore, a higher performance.

A trading system architecture according to an example embodiment provides performance metrics including 20+ million quotes per second, 35 microsecond average round trip time of a quote with no system load and 125 microsecond average round trip time for orders routed, e.g., through a FIX Gateway.

As will be described in greater detail below, an electronic trading platform according to an example embodiment uses multicast messages as a primary method for messaging throughout the distributed Trading System platform. Because multicast, by virtue of the multicast protocol, entails the replication and distribution of messages to subscribing joiners at the network hardware layer to the multicast groups, the use of this protocol supports the distributed nature of the Trading System software design and ensures fair access to all subscribers. An electronic trading platform according to an example embodiment provides a messaging infrastructure (described in more detail below) that guarantees the delivery of multicast message traffic to all destinations within the Trading platform, even though the multicast protocol itself does not guarantee the delivery of such traffic.

An electronic trading platform according to an example embodiment comprises 10 Gbit Ethernet network technology to provide both speed and stability at the network infrastructure layer. 10 Gbit Ethernet provides an extremely fast network transport as well as a time-tested reliable technology. Additionally, because Ethernet is a mature technology, it benefits from vast support for network analysis, monitoring and control. Furthermore, the electronic trading platform may comprise 10 Gbit network interface cards that feature accelerated Ethernet network processing. This technology provides faster processing of transport control protocol (TCP), user datagram protocol (UDP) and multicast traffic. Use of this technology enhances the performance of the electronic trading platform by more quickly processing traffic read off of the network wire and passing it up to an application (e.g., a matching engine) for processing, eliminating the overhead associated with passing data through the system kernel.

An electronic trading platform according to an example embodiment comprises a performance monitoring capability that provides an in-depth view of all services (e.g. FIX Order Interface, local exchange Express Interface, Top of Market Feed, etc., described in more detail below) throughout the electronic trading platform. Each application service produces latency and throughput metrics that are displayed in real-time to System Operations. This provides in depth access of the Trading System's performance to enable the observation and trending of performance related metrics.

In keeping with the goal of providing high throughput while managing the size of the data center footprint, an electronic trading platform according to an example embodiment provides scalability by creating multiple independent trading environments (a.k.a. "clouds") consisting of a dedicated set of independent Trading System software processing components that, as a collection, conduct all of the functional processing necessary for trading.

According to an advantageous feature of the present invention, a suite of symbols are traded across the multiple clouds, and are thereby load balanced. So, for example, the range of symbols traded on the local exchange are split across the plurality of clouds. Thus, each cloud might perform trading for a subset of all the traded symbols (a stock symbol or ticker symbol being an abbreviation used to uniquely identify publicly traded shares of a particular stock on a particular stock market), or even a single symbol, for very highly traded instruments. Such load balancing of traded symbols aids performance because it distributes the load across multiple trading environments and provides the electronic trading platform with the flexibility to move trading products between clouds based on resource usage.

Figure 1B:
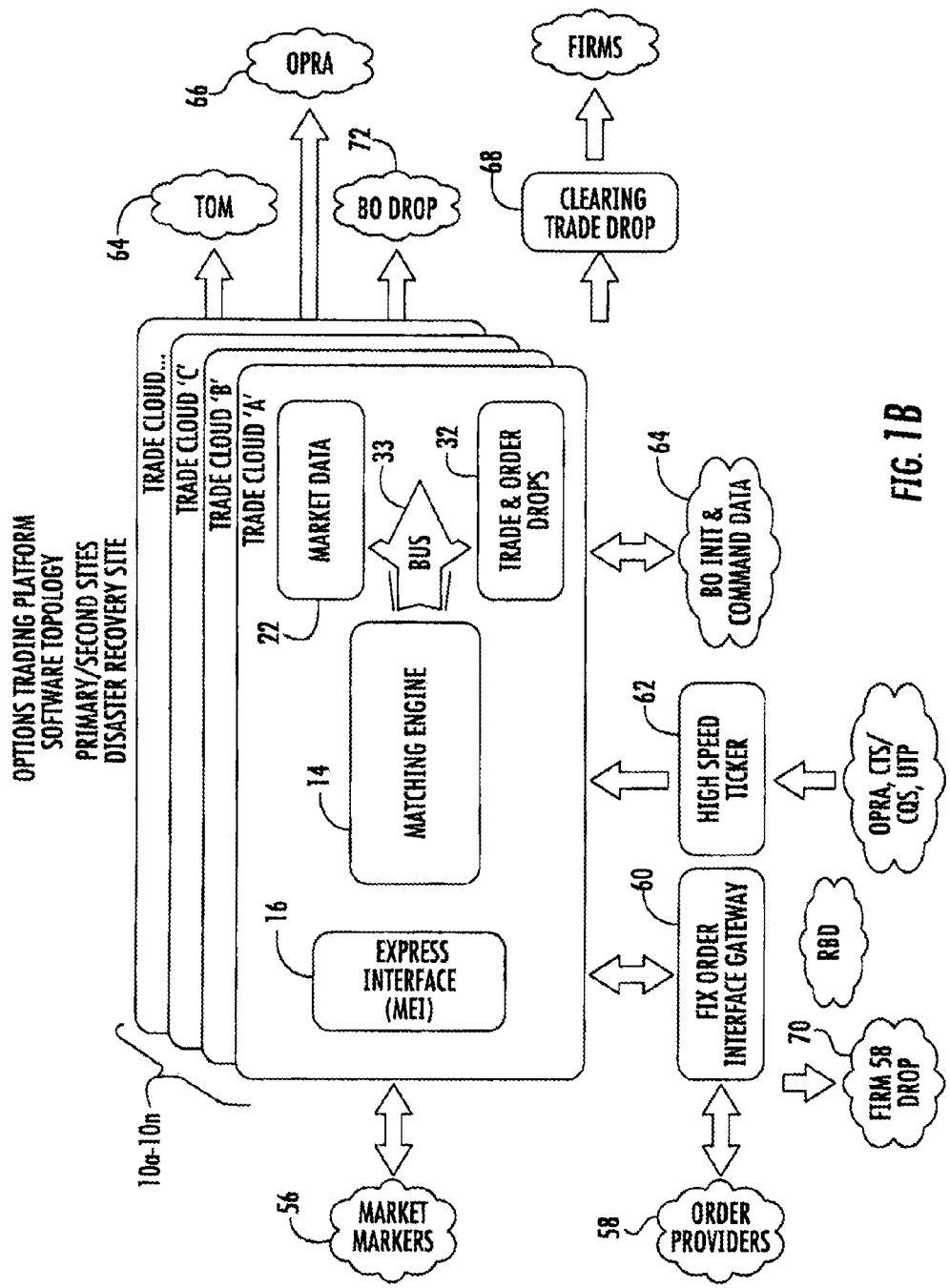
FIG. 1B is a block diagram of a software topology of an electronic trading platform according to an example embodiment.

As shown in FIG. 1B, each cloud, i.e., collection of components, e.g., clouds 10a . . . 10n, is operationally independent from all other clouds such that all operational commands, controls and monitoring tools are "cloud aware." System Operations may thus easily identify and operate each cloud individually or collectively. Additionally, the electronic trading platform has a structured cloud configuration model that greatly facilitates a process for instantiating additional clouds.

FIG. 1B is a block diagram of an electronic trading platform according to an example embodiment. By virtue of the trading cloud approach and the operational support built into an operations configuration and command suite of example embodiments, the electronic trading platform has the built-in capability to readily scale the software as the demand for performance increases. A cloud is a logical grouping of services hosted on shared infrastructure and controlled internally within Data Centers facilitating trading on predefined groups of options. Based on the architecture, selected core applications (or multiple instances of the same application) are "cloud specific" and other applications are designed to be "cloud agnostic."

As can be seen in FIG. 1B, market makers 56, i.e., quoting firms, submit quotes, and receive information from, the matching engine 14, by communicating with an MEI application 16. The MEI application 16 receives quotes, typically block quotes, from market makers 56, and, as will be described in greater detail below, stores the quotes in a shared memory accessible by the matching engine 14 for use, e.g., in matching, by the matching engine 14, the received quotes with contra-side orders. Thus, as can be seen in the figure, each cloud is configured to facilitate bidirectional communication with market makers 56 using the MEI application 16.

Order providers 58, on the other hand, communicate indirectly with the cloud via a FIX interface gateway 60. Unlike the MEI application 16, the FIX interface gateway 60 is not specific to a cloud. Rather it is used by all the clouds. The FIX interface gateway 60 has logic that determines the symbol associated with the received orders and routes the orders to the IP address of the appropriate cloud. Thus, for example, the FIX interface gateway 60 has a look up table to associate the symbol, cloud, and IP address of the cloud, and then transmit the order to the appropriate IP address in the message to be sent to the cloud (and matching engine) on which the order will be executed.

Each cloud's matching engine 14 additionally receives information about the current state of the market from the high speed ticker 62, which forwards quote information from OPRA, CTS/CQS and UTP, for example to ensure that the matching engine 14 is informed of the situation in the market as a whole. As will be described in more detail below, the matching engine 14 accesses this market information also from a shared memory.

The matching engine (ME) 14 provides market data to outside of the trading system, for example, for customers that may wish to take or hit an order resting on the system's book. For this purpose, each cloud, based on the activity of the matching engine 14, updates a top of market feed (TOM) 64, which is provided, based on all the information received by, and matching performed by, the matching engine 14, via the market data 22. The same information is also provided to OPRA 66, as required by U.S. trading regulations.

The architecture supports multiple instances of the core Quoting Interface (MEI application) 16 on a single cloud, the multiple instances being shown more clearly in figures to be discussed below. The matching engine 14 and outbound OPRA Feed applications (incorporated in the market data 22 in the high level depiction of FIG. 1B) are cloud specific, having at least a single instance per cloud. Fix Order Interface ((FOI) 60 applications—which provide an order entry interface and routing to the appropriate cloud application and other similar applications, are cloud agnostic because they are run or executed outside of any specific cloud. A cloud based architecture thus provides maximum flexibility from a scalability and performance point of view.

Incoming information as to the state of the market is received by the matching engine 14 from the high speed ticker 62, which includes, e.g., OTP, CTP and UTP information, developed from OPRA, CTS/CQS and UTDF/UQDF information sources. Completed trades are dropped to the Firm 58 drop 70 for billing. All orders, trades, reference data and BBOs are sent to the BO (Back Office) Drop 72 for storage in the back office of the trading system.

Data published/disseminated from each cloud is available for consumption on a central messaging bus backbone. This backbone is shown in more detail in figures below and is shown highly schematically as Bus 33 in FIG. 1B. Different applications, based on their business logic, subscribe to the messages disseminated and perform their required actions responsively thereto. The central messaging backbone architecture facilitates reduced latency and allows for more scalability as needed. Each application has discrete functionality and, in case of any unexpected erroneous behaviors, becomes less complex to recover functionality accordingly.

The cloud architecture further lends itself to optimized symbol balancing which ensures each matching engine 14 can consistently cater to different spikes in quote throughput rates and trading volume on certain option(s) class. Each cloud also sends trade data to the clearing trade drop 68, which performs an entitlement based clearing trade interface for trading participants. The results of the clearing are send to the trading firms.

An electronic trading platform according to an example embodiment achieves hardware scalability by employing a container concept to server and network hardware platforms. The container concept localizes all network and server hardware into a grouping that is insulated from other containers. For example, a Trading System container is independent from a Back Office Systems container. This greatly facilitates the scaling of a given container as it is isolated from other containers thereby reducing the network integration points to points of the container being expanded.

An electronic trading platform according to an example embodiment provides high resiliency and narrow fault domains with fully redundant services throughout the architecture. Software resiliency is achieved by various techniques via a suite of redundant services. At the software layer within the electronic trading platform, the platform provides redundant backup applications for each of the Trading System software applications in one of three options: 1) Hot-Hot; 2) Hot-Warm; and 3) Hot-Cold.

A Hot-Hot paradigm for achieving software resiliency is preferred. However, not all software problem domains allow for such an approach. For example, in some cases the message processing capacity requirements precludes a Hot-Hot approach. In some cases, where there is an external interface, a Hot-Hot approach may not be feasible for the external entity utilizing the given interface. Additionally, the complexity of a given functional problem may make Hot-Hot processing extraordinarily complex and thereby create enough risk that it outweighs the benefit. In these instances, an electronic trading platform according to an example embodiment may employ a Hot-Warm approach to failover as a secondary approach to meeting resiliency demands.

In a Hot-Warm approach, failing over to a backup application is greatly facilitated by virtue of the backup application's runtime state being synchronized with the primary application. Therefore, failing over to the backup application is mainly reduced to activating the backup application's mode from backup to primary. A Hot-Cold approach may be used where neither a Hot-Hot nor Hot-Warm approach is viable. For example, a Hot-Cold approach is utilized when coordination with an external participant is required and when such coordination may take a non-deterministic duration to complete.

FIG. 2 is a block diagram illustrating redundant components of a single cloud of an electronic trading platform according to an example embodiment. In addition to multiple clouds, each handling trades on a symbol basis, the trading system, in accordance with the present invention, also has, for each cloud, redundancy, for example by location. This is shown in FIG. 2, using multiple instances of the components previously set forth in the diagram of FIG. 1B to achieve hardware resiliency. The components perform the same functions as discussed in connection with FIG. 1B and their individual functions will not be repeated here in relation to FIG. 2.

As illustrated in FIG. 2, to achieve server hardware resiliency, software of the electronic trading platform is configured such that all primary applications run on server hardware residing in a primary data center 300 (NY4P) and all backup applications run on redundant server hardware residing at a secondary data center 302 (NY2S). The electronic trading platform thereby achieves two benefits: 1) if a server failure occurs, because the backup application software runs on a redundant server, the system provides resiliency at the server level; and 2) if a data center failure occurs at NY4, since all backup software runs on redundant servers located at a secondary data center, the system provides data center resiliency. The proximity of NY4 and NY2 ensures that no latency factors are introduced as a result of switching between the primary and secondary server.

Narrowing the impact of faults is an architectural objective of example embodiments because it limits the negative impact of such faults on operations while the redundant services are being introduced. An electronic trading platform according to an example embodiment narrows the impact of failure by creating software components as discrete functional units assigned to provide services to as narrow of a service domain as is feasible. For example, a Clearing Trade Drop (CTD) service is a client facing service that is designed as a collection of discrete application instances with each discrete instance servicing only a single client. A failure of a given instance thereof thus affects only a single client. This is one of the ways the electronic trading platform narrows the fault isolation at the software layer for client facing applications such as CTD, the FIX Order Interface (FIO) and the Express Interface (MEI).

For applications that provide server facing services, for example a Watch Dog/Purge (WDP) server application, the applications are localized into each cloud and limited to providing services to the assigned cloud only. A failure of a given server oriented trading service is thus limited in scope to the given assigned cloud. With numerous clouds providing trading services, this helps insure that, in the event of a failure of a server facing application, other clouds are insulated from impact.

FIGS. 3-7 illustrate flexible software and hardware architecture attributes of an electronic trading platform according to an example embodiment. Software architecture of the electronic trading platform provides adaptation to trade securities instruments, including, e.g., options, equities and futures. Using componentization, centralization of business logic and elimination of reliance on the underlying product symbology at the software architectural layer and object oriented programming languages such as C++ at the software layer, an electronic trading platform according to example embodiments is more easily customized for new functionality or new product sets. The software architecture's performance characteristics meet the characteristics required to trade all types of instruments.

An electronic trading platform according to example embodiments shown in FIGS. 3-7 comprises applications that are grouped into at least two different domains based on their roles, namely, Trading Systems and Business Systems. In the example, it will be assumed for purposes of illustration that the system is an Options Trading System. However, the Trading System also is applicable for trading of any tradable securities and derivatives. The Trading System supports the following operational activities: all automated options trading activities, data forwarding to Business Systems for: Trading Operations Help Desk Support, Surveillance, Trade clearing and Billing and Data, forwarding to OPRA for: Trade Reporting and local exchange BBO dissemination. The electronic trading platform supports the following customer interfaces: FIX Order interface (FOI) 401 in the FIX Gateway 400, Quoting Interface (MEI) 16, Clearing Trade Drop 900 and Top of Market Feed 28. Market Data Inputs are supported by the electronic trading platform via a High Speed Ticker 500 from an Underlying Market Data interface (CTA app 504, UTP app 506) and an OPRA market data interface app 502.

An electronic trading platform according to an example embodiment may run on RED HAT Linux 6.1 Enterprise Version 64 bit. Proprietary software components may be developed using the C++ language.

Figure 3:
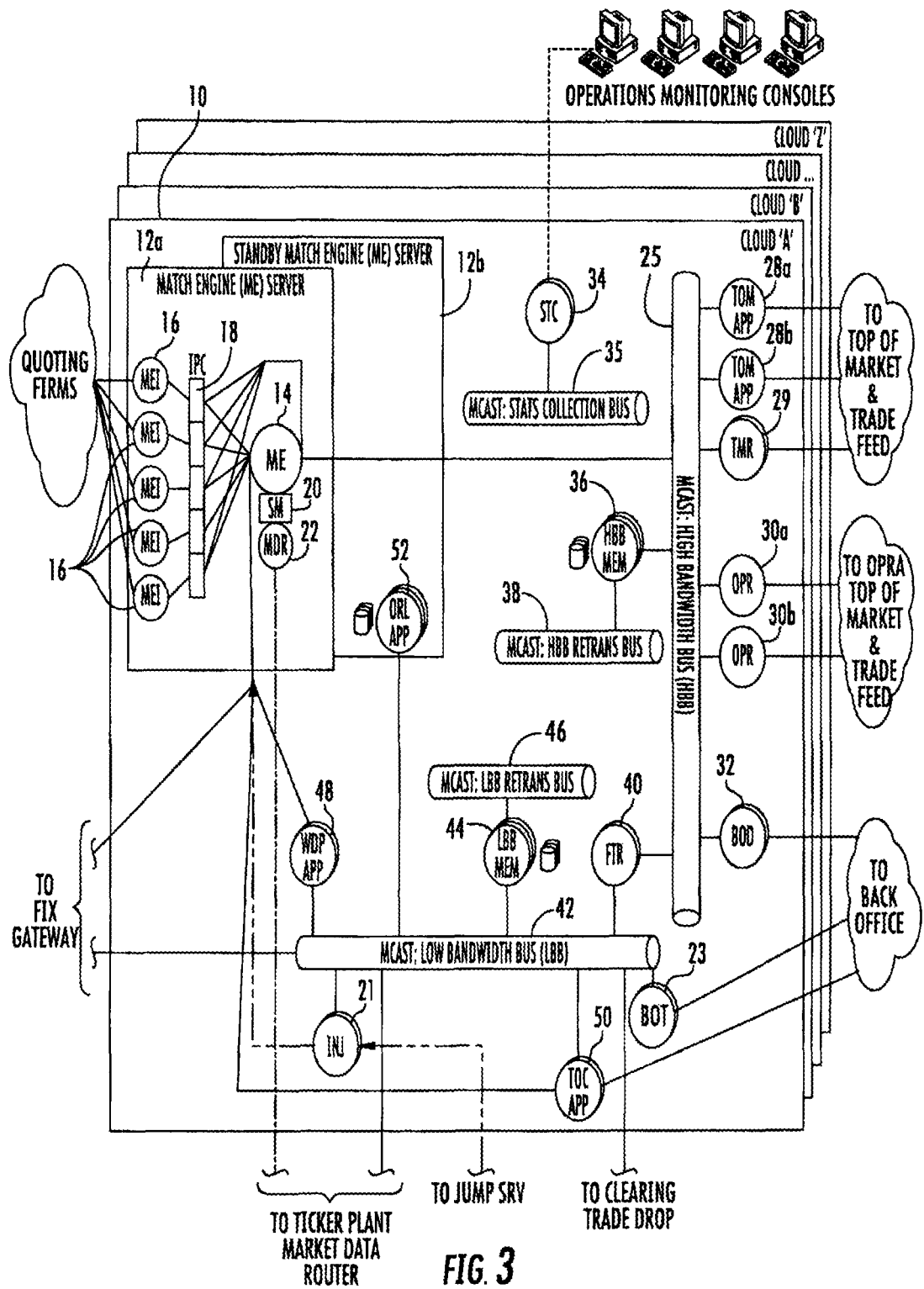
FIGS. 3-7 are block diagrams that, when taken together, illustrate an electronic trading platform according to an example embodiment.
Figure 4:
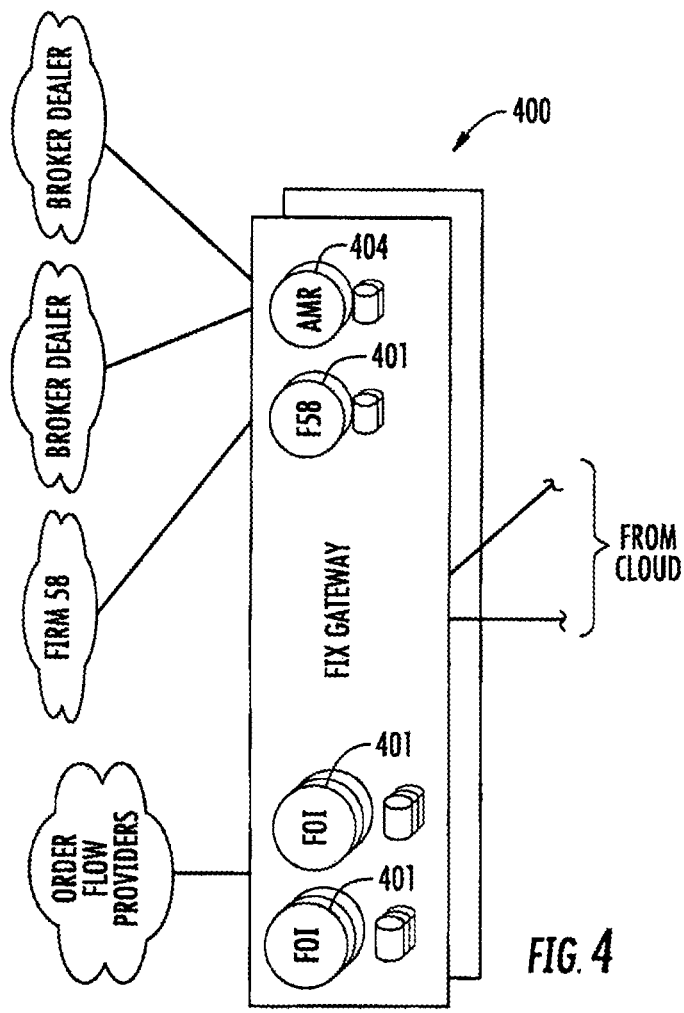
Figure 5:
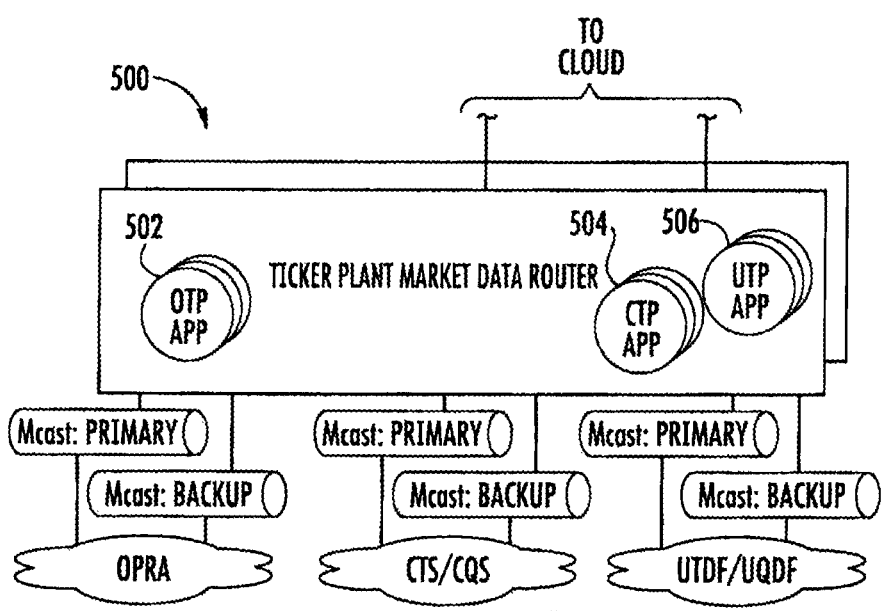
Figure 6:
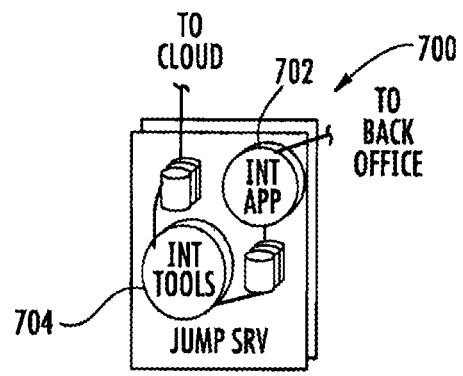
Figure 7:
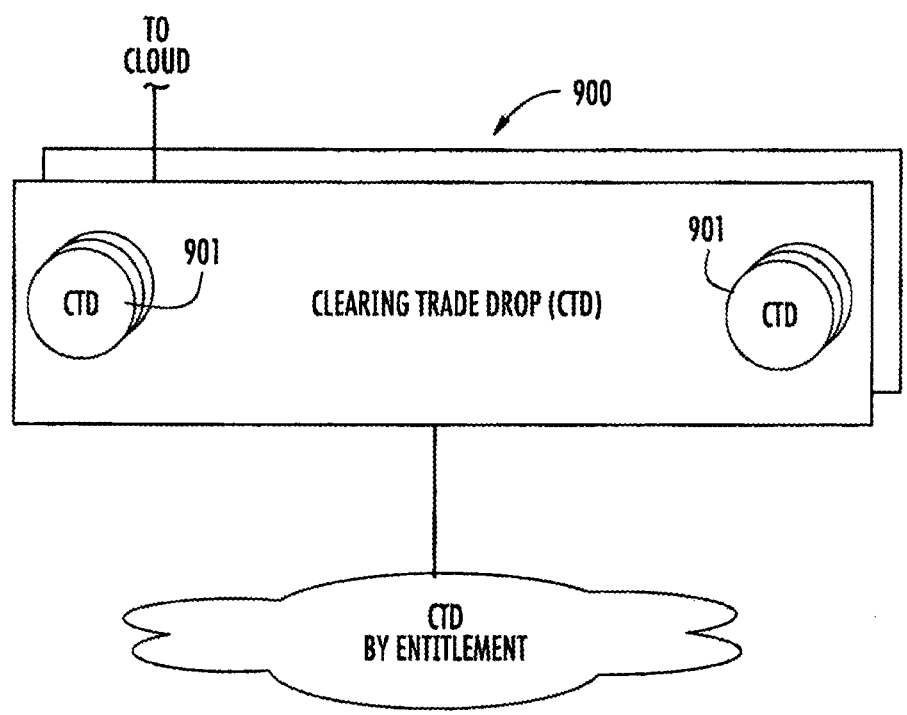

FIG. 3 illustrates in detail a single cloud of the multi-cloud electronic trading platform and FIGS. 4-7 illustrate the components of the trading system outside of the cloud. The predominant information provider to applications in the cloud is the matching engine 14, whose output, including reports of all trades, is sent in a plurality of multi-cast messages to the MCAST High Bandwidth Bus 25, from which the information is accessible by other applications. As will be discussed in greater detail below, the matching engine 14 generates trade data based on quote and order information it receives from the MEI 16, in the case of quotes, and from the FIX gateway 400. As will be described in greater detail below, the matching engine 14 reads block quotes from market makers that have been placed into shared memory by the MEI 16, of which each cloud may have multiple instances. The matching engine 14 does not receive interrupts from the MEI 16 to inform it of the presence of quotes. Rather, the matching engine 14 reads the shared memory, in round robin fashion, and, as quote blocks are found, handles the quote blocks in their entirety before moving on to a different task. Once a quote block has been handled, the matching engine 14 checks its MCAST port to handle any requests for information that may have come in the meantime, again handling all of these requests over MCAST before next reviewing the shared memory for additional quote blocks. The matching engine in never accessed via an interrupt, and thus atomically addresses quote blocks, and MCAST messages, for example, in their respective entireties, before moving on to another task.

With regard to other applications on the cloud, the cloud may comprise, for example, two instances of Top of Market application (TOM), in this case 28a and 28b. The TOM application (28a, 28b) provides a Proprietary Trade and local BBO Feed to Subscribers (available to all exchange members and to non-members) and has a HOT-HOT failover design. The TOM application (28a, 28b) leverages a centralized logging mechanism for capturing warning and error conditions. Real-time application activity and performance monitoring is accomplished via a customer monitoring application.

Each cloud also includes a TOM Retransmit application (TMR) 29. The TMR application 29 is a retransmission service for the TOM (28a, 28b) and has a HOT-HOT failover design. The TMR application 29 leverages a centralized logging mechanism for capturing warning and error conditions and provides real-time application activity and performance monitoring. The BO Drop application (BOD) 32 provides a Feed to the Business Systems of all Cloud Traffic, including orders, trades, BBOs, reference data, to the back office, with value added content and has a HOTWARM failover design. The BOD for Trades application (BOT) 23 provides a Feed to the Business Systems application for sending Trade info to the Options Clearing Corporation (OCC) for clearing and has a HOT-WARM failover design. The BOD for Trades application (the function of which is incorporated in the BOD 32 but is for trades only) leverages a centralized logging mechanism for capturing warning and error conditions with real-time application activity and performance monitoring accomplished via a customer monitoring application.

An OPRA Outbound application (OPR) 30a, 30b provides a Trade and local exchange BBO Feeds to OPRA and has a HOT-WARM failover design. The OPR application 30a, 30b leverages a centralized logging mechanism for capturing warning and error conditions with real-time application activity and performance monitoring accomplished via a customer monitoring application.

An Initialization download application (INT app 702) runs in the Jump server 700 and provides an interface to the Business Systems, such as the back office, for submitting initialization data to the Trading System, and has a HOT-WARM failover design. The INT application 702 leverages a centralized logging mechanism for capturing warning and error conditions. An Initialization Injector application (INJ) 21 injects initialization content into the matching engine 14 for distribution into the trading cloud and has HOT-WARM failover design. The INJ application 21 leverages a centralized logging mechanism for capturing warning and error conditions.

An Initialization Tools application (INT tools) 704 is in the Jump server 700 and verifies Initialization Data and has a stand-alone failover design. The INT tools application leverages a centralized logging mechanism for capturing warning and error conditions.

The watchdog (WDP) application 48 provides automatic quote protection in case of a firm wide disconnect by automatically purging quotes for a given Market Participant Identifier (MPID) on a given cloud. The Watchdog/Purge application (WDP) 48 is a watchdog application configured to purge on MEI disconnects/MEI failures. It also functions to unravel MPID purges into underlying purges. An MPID authorizes a firm to trade options of the underlying stocks. Therefore, an MPID maps to multiple underlyings. For example, MPID123 maps to stocks DELL, IBM and HP. An MPID purge allows a firm to request a purge to MPID123, in which case the WDP 48 can in turn purge DELL, IBM and HP for that MPID, essentially purging all options with DELL, IBM or HP.

The WDP application 48 has a HOT-WARM failover design and leverages a centralized logging mechanism for capturing warning and error conditions with real-time application activity and performance monitoring accomplished via a customer monitoring application.

A Filter application (FTR) 40 creates a Low Bandwidth Bus (LBB) 42 from a High Bandwidth Bus (HBB) 25 by filtering out all bus configured traffic from the Trading System and sends remaining data to its recipients (e.g. the FIX Order Interface 401 in the FIX Gateway 400, Ticker Plant 500, etc.) and has a HOT-WARM failover design. Thus, as shown in the figure, each cloud of the electronic trading platform according to an example embodiment accordingly has separate HBB and LBB buses 25 and 42, respectively, shown in FIG. 3, and the FTR application 40 filters a portion of the data from the HBB for distribution on the LBB. The FTR application 40 leverages a centralized logging mechanism for capturing warning and error conditions with real-time application activity and performance monitoring accomplished via a customer monitoring application.

A MEM application including HBB MEM 36 and LBB MEM 44 collects all bus traffic and services replay requests and each has a HOT-HOT failover design. The MEM applications plug into a multicast stream, and receive and store all messages. The MEM applications also respond to gap fill requests from the edge applications in the event that an edge application perceives a gap in the message stream. The MEM applications have "plug and play" capability in production in the sense that a new MEM can be introduced in the network in the event that others MEMs experience a hardware failure. The MEM applications uses the Multicast Agile Communication Highway (MACH) protocol API, discussed in more detail below, for receiving inbound messages. The MEM applications may use either unicast or TCP Session Management (SesM) protocol to handle gap fills depending upon a size of the gap fill request. In particular, the HBB MEM 36 connects with the MCAST HBB retransmission bus 38 for retransmitting messages that were lost during a gap in transmission, and the LBB MEM 44 connects with the MCAST LBB retransmission bus 46 for retransmitting messages that were lost during a gap in transmission. The MEM applications leverage a centralized logging mechanism for capturing warning and error conditions with real-time application activity and performance monitoring accomplished via a customer monitoring application.

An Express Interface application (MEI) 16, multiple instances of which are preferably provided for each cloud, supports liquidity provider, i.e., quoting firm (market maker) access to the local exchange (Interface App) and has a HOT-HOT failover design. For a particular cloud, each instance of the MEI application 16 is associated with a particular quoting firm, and is also associated with a particular area, or "bucket" in the IPC 18. As can be seen in FIG. 3, each MEI 16 is in communication with a particular area/bucket of the IPC 18. Quote blocks from the associated quoting firm are placed in a respective associated bucket reserved for that firm.

The MEI 16 also leverages a centralized logging mechanism for capturing warning and error conditions with realtime application activity and performance monitoring accomplished via a customer monitoring application. Each instance of the MEI 16 communicates with its associated market maker (quoting firm) and places quote information, preferably block quotes, from that associated firm directly into the appropriate bucket in the shared memory IPC 18, without interrupting the matching engine 14. As will be described in more detail below, the matching engine 14 checks buckets of the shared memory IPC 18 to determine if quotes are present that need to be processed.

The matching engine (ME) 14 supports all trading logic for the system, handling all trade processing, and has a HOT-COLD failover design. The ME 14 handles reading, validation processing for the purpose of handling quotes for the Quoting Firms, via the MEI 16, and orders from order flow providers, via the FIX gateway 400. Quotes provide liquidity and typically the price of the market for each option product. Orders, on the other hand, take liquidity from the market, by a participant taking or hitting the quote. The ME 14 application leverages a centralized logging mechanism for capturing warning and error conditions with real-time application activity and performance monitoring accomplished via a customer monitoring application. The ME 14 communicates two ways, either via multicast messaging or by shared memory, such as the IPC 18 for quotes and the SM 20 for market information from the MDR 22.

The MEI 16 and the ME 14 cooperate to support processing of quotes in the following manner.

In a typical scenario for quotes, the MEI 16 receives a Quote Block from a market maker. A Quote Block contains up to 50 single sided quotes. The MEI 16 validates the quote block and transforms it into an internal format as a single unit to send along to the matching engine (ME) 14 by writing the quote block to a dedicated shared memory area, i.e., bucket, for Inter-Process Communication (IPC) 18.

Figure 8:
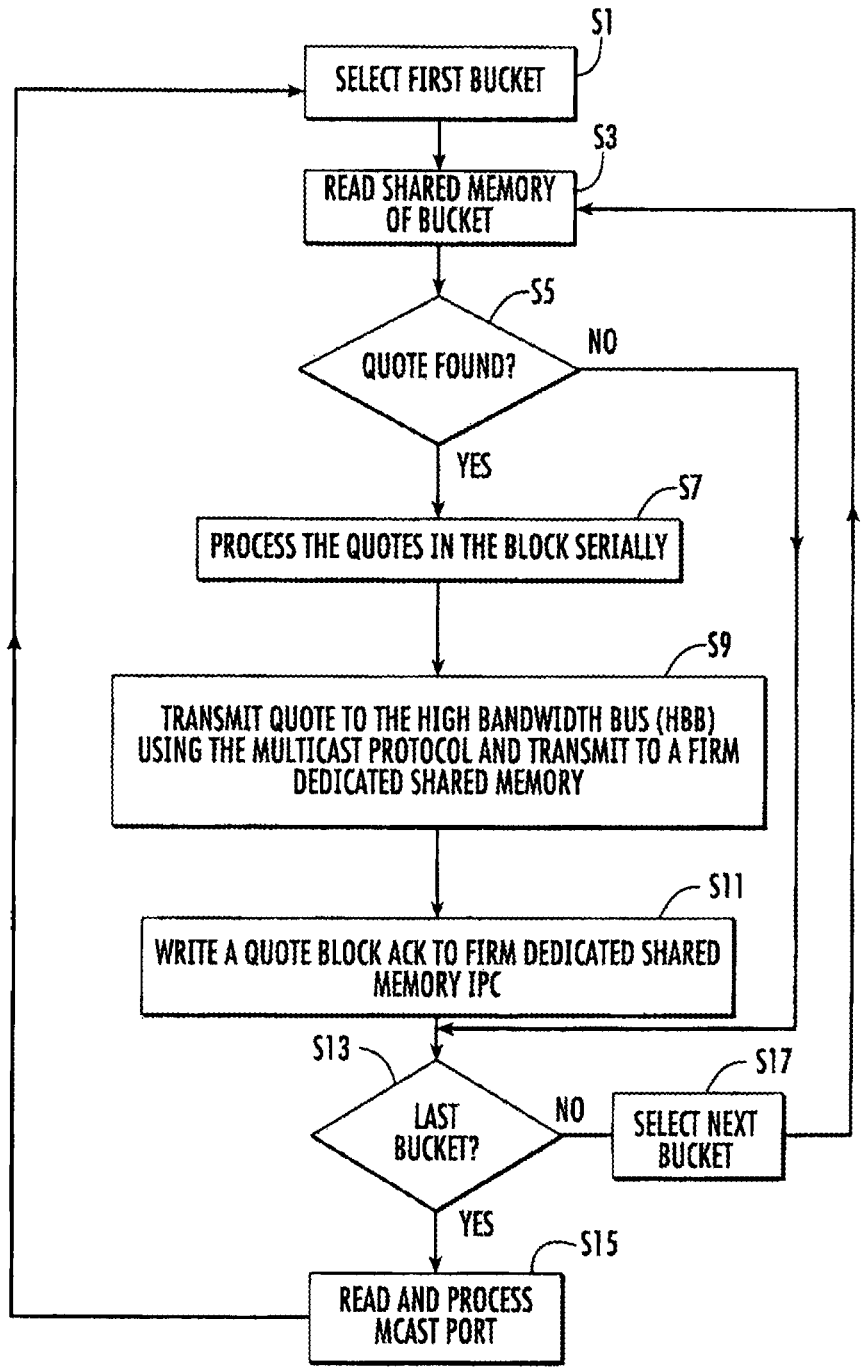
FIG. 8 is a flowchart illustrating the processing performed by the matching engine in processing quotes from market makers.

The ME 14 handles processing of the quotes in accordance with the flowchart of FIG. 8.

The ME 14 performs a round robin read of the buckets of the IPC 18, and then checks the multicast stream port for multicast communications, asynchronously reading the Shared Memory IPC 18 in round robin fashion. The ME spins at 100% cpu speed checking the Shared Memory IPC 18 for new quote blocks to process.

At step S1, the matching engine (ME) 14 begins the reading of the IPC 18 by selecting the first bucket of the IPC 18 and at step S3 reads the selected bucket of the IPC 18. If, at step S5, it is determined that no quote is found in the currently selected bucket, the flow proceeds to step S13, where it is determined if the current bucket is the last bucket in the IPC 18. If it is the last bucket, the flow proceeds to step S15 at which the ME 14 reads and processes MCAST messages from the MCAST port. Then the flow loops back to step S1 to select the first bucket again to start the process over again.

If, on the other hand, it is determined at step S5 that a quote is present in the current bucket, the flow proceeds to step S7, at which the ME 14 processes the quotes in the block serially. Each quote is processed as a discrete unit, entered into the electronic book, checked against the internal market and the Away Market BBO (ABBO located in the Shared Memory based Market Data Store) for possible execution. At step S9, executions are processed as needed and then each quote is transmitted to the High Bandwidth Bus (HBB) 25 using the multicast protocol and transmitted to a firm dedicated bucket in the Shared Memory IPC 18.

The ME 14 processes the quotes in a given quote block as one atomic unit, meaning no other transactions are initiated other than those derived from each quote in the block. At step S11, upon completion of processing a given Quote Block, the ME 14 writes a Quote Block ACK to a firm dedicated bucket of the Shared Memory IPC 18. After step S11, at step S13, it is determined if the last bucket has been processed. The case in which it is the last buck has been discussed above. If it is not the last bucket, then the flow proceeds to step S17, at which the next bucket is select, and the flow proceeds back to step S3, to read the shared memory of the currently selected bucket.

During the course of the ME 14's flow depicted in the flowchart, The MEI's 16 asynchronously read their respective firm dedicated Shared Memory IPC 18 checking for processed Quotes and Quote Block ACKs. Upon receiving a quote, the MEI 16 stores it in memory for later use. Upon receiving a Quote Block ACK, the MEI transmits the ACK to the originating Market Maker.

The matching engine 14 handles Multi-cast messages upon having finished reading and processing any quote blocks from the firm-associated buckets of IPC 18. That is, after finishing processing any block of quotes in each bucket, the matching engine checks its MCAST input port for messages that may have arrived from other applications in the trading system while it has been handling the blocks of quotes. Before returning to searching the IPC 18 for additional quote blocks, the matching engine 14 handles all requests that have been waiting on the input port.

A Market Data Reader application (MDR) 22 processes and loads ticker data into shared memory 20 for processing by the matching engine 14 and has a HOT-COLD failover design. The ME application 14 polls the shared memory 20 to receive updates to the ticker data as needed. The MDR application 22 leverages a centralized logging mechanism for capturing warning and error conditions and real-time application activity and performance monitoring is accomplished via a customer monitoring application.

High Speed Ticker Plant 500 provide from an Underlying Market Data interface (CTA app 504, UTP app 506) and an OPRA market data interface app 502. The Ticker Plant 500 applications provide underlying and option away market quotes and trades to support trading decision making and has a HOT-WARM failover design. The Ticket Plant application 500 leverages a centralized logging mechanism for capturing warning and error conditions with real-time application activity and performance monitoring accomplished via a customer monitoring application.

The FIX gateway 400 includes, in addition to the FOI 401 discussed below, an Away Market Order Router application (AMR) 404 and a Firm 58 Drop application (F58) 406.

The AMR application 404 functions as the FIX order parser, router and forwarder for orders routed to away options exchanges. The AMR application 404 supports routing orders to away options exchanges via independent order routing Broker Dealer(s) and has a HOT-WARM failover design. The AMR application 404 leverages a centralized logging mechanism for capturing warning and error conditions with real-time application activity and performance monitoring accomplished via a customer monitoring application. The F58 application 406 drops trade data to Firm 58 for billing purposes and has a HOT-HOT failover design. The F58 application 406 leverages a centralized logging mechanism for capturing warning and error conditions with real-time application activity and performance monitoring accomplished via a customer monitoring application.

The FIX Order Interface application (FOI) 401 in the FIX Gateway 400 supports order provider access to the FIX Order Entry Interface and has a HOT-WARM failover design. The FOI application 401 leverages a centralized logging mechanism for capturing warning and error conditions with real-time application activity and performance monitoring accomplished via a customer monitoring application. The FIX Gateway 400 provides a single entry point to the market and handles order routing to the MEs 14. Preferably, each FOI 401 application is dedicated to a particular connection to a firm, i.e., order flow provider.

An Order Logger application (ORL) 52 processes all order adds and updates to maintain and log the current order book state for the purposes of matching engine failure recovery and has a WARM-WARM failover design. The ORL application 52 leverages a centralized logging mechanism for capturing warning and error conditions with realtime application activity and performance monitoring accomplished via a customer monitoring application.

A Clearing Trade Drop 900 includes clearing trade drop applications (CTD) 901. The CTD applications 901 provide a Proprietary Clearing Trade Drop (i.e., interface) to Subscribers based on pre-configured entitlements, and have a HOT-HOT failover design. The CTD applications 901 leverage a centralized logging mechanism for capturing warning and error conditions with real-time application activity and performance monitoring accomplished via a customer monitoring application. Preferably, an exclusively dedicated CTD application 901 is provided per client.

A Stats Collector application (STC) 34 collects, collates and publishes statistics received by Trading Systems Apps for various Monitoring GUIs from the MCAST Stats Collection Bus 35 and has a HOT-HOT failover design. The STC 34 application leverages a centralized logging mechanism for capturing warning and error conditions.

A trading operations command (TOC) application 50 is an interface between the Business Systems Help Desk app and the Trading System and has a HOT-WARM failover design. The TOC application leverages a centralized logging mechanism for capturing warning and error conditions.

Referring to FIGS. 3-8, the matching engine (ME) 14 is a core functional business component of the electronic trading system. An electronic trading platform according to an example embodiment may comprise a plurality of matching engines 14 (e.g., twenty four) to distribute processing load; however example embodiments are not limited thereto and an electronic trading platform may comprise more or less than twenty four Trade matching engines. The MEI applications 16 and matching engine 14 application for each particular cloud reside on the same physical server to minimize network hops between the client and the matching engine. In contrast, the FOI applications 401 may reside on a separate physical server, e.g., the FIX Gateway 400, from the MEs 14 and send data/orders to a particular ME 14 via a command port without utilizing the shared memory IPC 18. As discussed above, the MEI applications 16 and the ME applications 14 for a particular cloud utilize a Shared Memory IPC 18 to speed communication therebetween.

Densely packed bulk quotes accessible by the ME 14 minimize I/O to increase speed. The MEI 16 atomically passes complete bulk quote blocks to the matching engine 14 for processing to minimize I/O overhead. The MEI 16 may receive quotes from Quoting Firms via TCP protocol messages. As discussed above, the MEI 16 does not use interrupts to notify the ME 14 that new or updated quotes/data have arrived. The MEI 16 instead writes the new or updated quotes/data to the shared memory IPC 18, and the ME 14 continuously polls the shared memory IPC 18. Thus, the MEI 16 and the ME 14 utilize shared memory IPC 18 to speed communication, and to allow the ME 14 to complete processing of the entire bulk quote fully before again searching the IPC 18 for more quotes. All other inputs to the ME 14 are by the ME 14's MCAST port, which is used by the ME 14 to receive MCAST messaging from Edge applications. Thus, for example, orders from the FIX Gateway are received by the ME 14 via MCAST messages at its MCAST port.

After the ME 14 reads a new quote from the shared memory IPC 18, the ME 14 determines if the quote has a matching contraside interest, performs allocation of any matching interests and transmits raw data about the quote and any match on the HBB 25. Analytics, however, are not performed on the raw data by the ME 14. All trading applications on the electronic trading platform may be developed. e.g., in C++, using only the fastest internal data structures. As shown in FIG. 3 dual matching engine servers 12a and 12b for each matching engine 14 and its respective MEI applications 16 may comprise Multi-core server technology to retain high throughput and low latency with multiple resources. As shown in the figures, MEI 16 and ME 14 applications reside in the same server minimizing network hops between the client and the ME 14.

All applications of the electronic trading platform may be pinned to CPUs, and applications share executing in poll mode to lower latency. The MEI 16 may comprise 10 Gbit Accelerated Ethernet Network Interface Cards with kernel by-pass Network Stack and Advanced High-Speed 10 Gbit Ethernet Switching Technology.

The ME 14 is configured to create internal books that keep the bid quotes on one side and offer quotes on another side for each series. In addition, the ME 14 is configured to keep track of the best bid and the best offer for each series. Pre-allocation of memory makes the ME 14 perform these functions in a very fast manner.

The ME 14 supports maintenance of a product cache for underlying and option series, and has the functionality to look up if a series is valid, and support new spin files for products.

The ME 14 provides support for what products the Market Makers are responsible for, for example, whether the Market Maker is the lead Market Maker.

With regard to Quotes, the ME 14 preferably is configured to perform the following functions:
  Accept Bulk Quote
  Process Bulk Quote
  Send Acknowledgement back
  Send all individual items back in acknowledgment
  Add Quotes to a cache within the ME
  Send Quote record updates
  Replace old quotes with new quotes With regard to Orders, the ME 14 preferably is configured to perform the following functions:
  Accept New Order
  Accept Cancel Order
  Accept Replace Order
  Add order to the book.
  Publish acknowledgement back
  Order Types supported by the ME 14 preferably include Market orders and Limit orders.

With regard to eQuotes, the ME 14 preferably is configured to perform the following functions:
  Accept New eQuote message
  Accept Cancel eQuote message
  Accept Replace eQuote message
  Add eQuote to the book.
  Send acknowledgment back to MEI.
  Order Types: Limit With regard to Trades, the ME 14 preferably is configured to perform the following functions:
  Cross Quote, eQuote, and Order
  Create basic trade record.

With regard to Allocations, the ME 14 preferably is configured to perform Price Time and Basic Pro-Rata allocations.

The ME 14 preferably supports the following Cleanup functionality:

Change all cache updates to record updates
Add Engine sequence number to all outbound messages
Add srcAppId for any record update
Update all sizes related to all liquidity sources.
CacheUpdate to RecordUpdate
Perform Cleanup to remove old logic for Product and Equity.

With regard to Statistics, the ME 14 preferably is configured to create a Histogram of time to add quotes to the book.

Each of the Discrete Trade Matching Environments (clouds) are logically segmented Software Topologies with no Software Level Interdependence; however, Configuration Management and Operational Command, Control and Monitoring are Trade Matching Environment aware. A speed of scaling of the electronic trading platform is solely limited to the timeliness of Hardware Infrastructure Implementation, and the Hardware implementation is facilitated through utilization of the container approach discussed above. The electronic trading platform enables Load Balancing down to a single underlying if necessary or desired.

The MEI 16 provides Bulk Quote Support, eQuote Support, support for single sided quotes, an Atomic Automated Risk Monitor, Line Disconnect Protection (Atomic protection on an MPID basis), Mass Quote Cancels including an Atomic Underlying wildcard purge, an Atomic MPID wildcard purge and Quote Protection Reset to control re-entry into the market, Series Update messages, Dynamic Automated Risk Monitor setting control and Extensive Notifications including notifications for System State, Trading Status, Quote Width Relief, ARM Protection Setting, Quote Protection, Liquidity Seeking Event, Quote Cancel and Execution Notifications.

As described above, the MEI 16 receives quotes from Quoting Firms and stores the quotes in the IPC 18. The Quoting Firms direct the quotes to the MEI applications 16 of a particular cloud based on the underlying symbol for the quote. For example, in the quoting interface for the MEI applications 16, the Quoting Firms map the quote to a specific IP. In contrast, the FOI applications described in more detail below, automatically route quotes to the appropriate cloud.

The MEI 16 provides Throughput of more than 24 Million Quotes per Second (i.e., more than 1,000,000 transactions/second/Match Engine) for twenty four Match Engines. The MEI 16 provides latency of 21 microseconds Average Client Round Trip Time (RTT) for a single quote (no load), and 71 microseconds Average Client Round Trip Time (RTT) for a 50 quote block (no load) and Determinism having a Standard Deviation of 1.8 microseconds (no load).

The FOI 401, for FIX orders, provides for New Order—Single, Order Cancel and Cancel/Replace, Mass Order Cancels by MPID or MPID/Underlying Pair and by Connection (Session), Execution Report, Order Status, exchange Order Monitor protection including Market Order Price Protection, Limit Order Price Protection and Order Size Protections and the FIX Order Gateway 400, which provides a single entry point to the exchange market and handles order routing to matching engines 14 of the multi-cloud trading system.

The FOI 401 provides throughput of 7,700 transactions/second/FOI instance (no load), Latency of 130 microseconds Average Client Round Trip Time (RTT) for an unexecuted IOC order and Determinism having a Standard Deviation of 7.6 microseconds (no load).

The plurality of matching engines 14 (over the multiple clouds) distribute processing load received from the FOI 401. The FOI 401 may comprise 10 Gbit Accelerated Ethernet Network Interface Cards with kernel by-pass Network Stack and Advanced High-Speed 10 Gbit Ethernet Switching Technology.

To achieve scalability, the FOI 401 may comprise Discrete FIX Gateway servers which independently provide the FIX Order Interface service, and Configuration Management and Operational Command, Control and Monitoring may seamlessly manage the FIX Gateway servers. A Speed of Scaling is solely limited to the timeliness of Hardware Infrastructure Implementation. As discussed above, a Jump Server 700 provides symbol info and parameters from external exchanges or sources to each cloud/ME.

Figure 9:
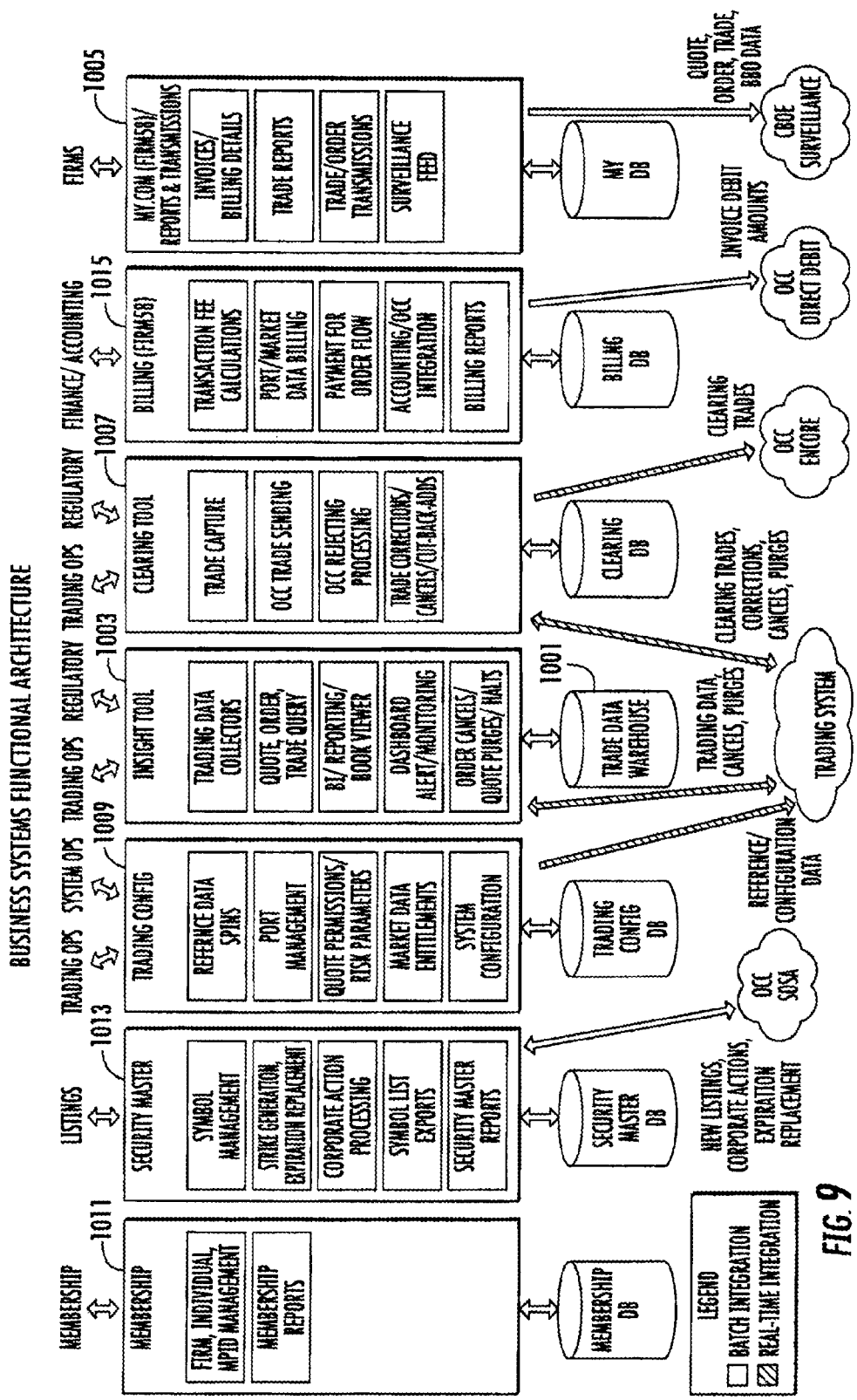
FIG. 9 is a block diagram showing Business Systems functional architecture of an electronic trading platform according to an example embodiment.

FIG. 9 is a block diagram showing Business Systems functional architecture of an electronic trading platform according to an example embodiment. The Business Systems encompass middle and back office systems that support the trading system and other operational functions of the electronic exchange including Reference/business data management systems, Data collection and warehousing, Clearing and trade correction processing, Billing and Reporting and business intelligence. The Business Systems platform comprises real-time integration with the Trading System and Options Clearing Corporation (OCC) and various batch processes and file-based integrations with other systems. Real-time integration of the Business Systems with the Trading System leverages a SesM TCP session management protocol. User interfaces are web-based intranet applications built using various Java technologies and frameworks, including Grails, Spring, Hibernate and MySQL. Trading data warehouse uses One Tick database and CEP engine that is specifically designed for faster insertion of records and support queries based on time series data. Billing and online portal use the Firm 58 application's exchange billing platform.

The Business Systems applications include a Trade Data Warehouse application 1001, an Insight Tool application 1003, a CBOE Data Feeds application 1005, a Clearing Tool application 1007, a Trading Configuration application 1009, a Membership application 1011, a Security Master application 1013 and a Billing application 1015, each of which leverage a centralized log file monitoring system, enterprise scheduling monitoring system and database monitoring tools.

The Trade Data Warehouse 1001 application stores all trades, orders, quotes and all system events and reference data generated by the trading system for use by help desk tools and reporting/business intelligence and has a HOT-HOT failover design. The Insight Tool application 1003 is a Trading Operations Support Tool used to query the trade data warehouse and invoke various admin functions, for example cancel orders, purge quotes and halt/open underlying's and has a HOT-HOT failover design. It also provides monitoring and alerting capabilities to the MIT dashboard alert. The CBOE data feeds application 1005 generates data feeds to be sent to CBOE for Surveillance and has a HOT-WARM failover design. The Clearing Tool application 1007 sends clearing trades to OCC and provides trade correction/cancel UI for Trading Operations Support, and has a HOT-WARM failover design. The Trading Configuration application 1009 provides a Central Repository and UI for managing all business and technical reference data required by the trading system and has a HOT-HOT failover design. The Membership application 1011 manages member firm, trader, personnel and MPID information and has a HOT-HOT failover design. The Security Master application 1013 manages underlying, class and option information and supports the listing process, and has a HOT-HOT failover design. The Billing application 1015 calculates non-transactional charges and loads transactional charges from the Firm 58 application for internal reporting purposes and has a HOT-WARM failover design.

Transmissions between the ME 14 and other applications (Edge apps), other than the MEI 16 are handled by a Multicast Agile Communication Highway (MACH). MACH provides a backbone for the exchange software. MACH is a scalable and lightweight multicast based protocol that allows a publisher to publish to many subscribers or "Edge Apps". It incorporates session level communication and a packet structure that allows subscribers, i.e., Edge Apps, to detect gaps in messages and know the start and end of a message session. MACH also works with MEMs 36 and 44 to provide full reliable gap recovery of messages from the source. The MEMs record all messages on the respective HBB and LBB buses to permit Edge Apps to gap fill, i.e., fill in any messages they may have missed during, for example, down time periods, e.g., caused by failures.

MACH comprises a library application for use if the application is required to communicate with another application. The library provides a simple API, hiding the complexity of communicating over multicast or local memory.

MACH uses multicast that allows the publisher, such as the matching engine 14, to publish once and all subscribers to receive the messages without any degraded performance with addition of new subscribers. This results in a lower latency compared to any fan-out based solutions. MACH bunches multiple MACH packets into a single UDP packet that reduces I/O calls at both ends allowing for increased I/O efficiency and performance. MACH is designed to be used in conjunction with higher level application messaging protocols that specify the contents of the messages that MACH distributes. The MACH protocol layer is opaque to the higher-level messages permitting it to encapsulate and distribute an application message consisting of ASCII or binary data. MACH uses frequent heartbeats to enable subscribers to proactively detect link or publisher failures. Note that MACH protocol does not provide any delivery guarantee. In case the subscriber detects a gap, publisher side applications are generally designed to have a separate retransmission service or redundant feeds, as will be discussed further below in connection with the MEMs.

Network connectivity is handled using multicast to enable high throughput and low latencies. MACH ensures messages are sequenced in FIFO order between applications as multicast does not guarantee message sequencing.

A MEM, preferably comprising, for each cloud, one each for the LBB (MEM 46) and the HBB (MEM 36), uses the Multicast Agile Communication Highway (MACH) protocol API for receiving inbound messages. The MEM, because it stores all messages, can fill gaps, and uses either multicast or TCP Session Management (SesM) protocol to handle gap fill requests from Edge Apps depending upon how big the gap fill request is.

Handling Inbound Messages

First, the MACH protocol API is used to listen to a MACH message stream on a configurable multicast group. This group can be the matching engine 14 output stream, a ticker plants stream or an edge application to matching engine stream. Then, each message is stored, as described further in the "MEM Store" paragraph below.

The MACH protocol handles gaps allowing MEM to assume receipt of messages in FIFO order with a callback for each MACH message (not each application message) hiding the fact that the MACH protocol allows for multiple application messages inside of each MACH message. The MACH protocol allows for heartbeat. MEM preferably stores these as well, to avoid gaps in MEM's message store.

MEM Store

MEM is configurable as to memory only storage, i.e., a circular buffer management with a configurable finite size, or disk only storage. If used, disk writes must be very efficient, i.e. fast. Or, if memory is used up to a configurable finite size, then disk storage may be used. Preferably, the oldest records are written to disk In the MEM storage, an Index is performed by a MACH sequence number, so as to handle quick look up of a range of messages in order to carry out gap fills (filling in missing messages). As MACH messages will be variable length in nature, MEM takes this into consideration so to make efficient use of storage space.

Figure 10:
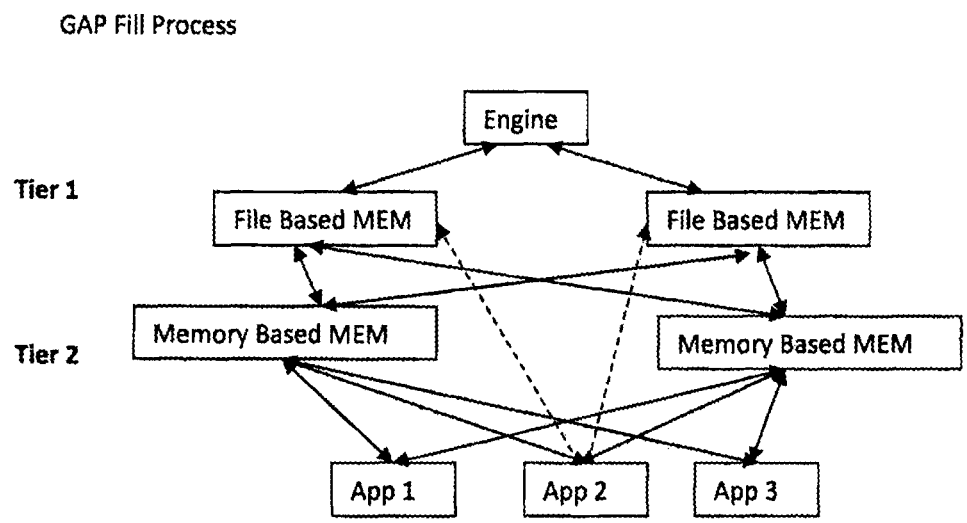
FIG. 10 is a flow diagram of a gap fill process.

The gap fill process using MEM is shown in the FIG. 10.

As shown in that figure, if an application needs a gap fill:

An application that detects a gap (note that the MACH protocol layer detects the gap) will broadcast a gap fill request (start seq number, end seq number) on a tier 2 gap-fill subnet. A number of memory-store MEMs (Memory Based MEMs) are configured to listen on that subnet. All MEMs that are free and that can service this request, i.e., have these requested messages in their store, will respond back to this application in one of the following ways:

If the gap is less than or equal to a configurable threshold (e.g., <=10 messages), all MEM apps receiving the gap fill requests will broadcast the messages to fill the gap across the tier 2 gap-fill subnet (this will result in multiple responders, which is not an issue for gaps below the configurable threshold.)

If the gap is greater than the configurable threshold (e.g. >10 messages):

MEM will respond to the gap fill request with a message containing its IP address and a port (and other SesM details);

The requesting app will establish a TCP connection to a MEM app;

MEM will accept and send out all these requested messages back.

The requesting application will disconnect from the MEM after the gap fill is satisfied.

If the MEM that responded back becomes busy servicing another application, then the requesting application will timeout waiting for a TCP response, and broadcast another request and repeat the above mentioned process.

A MEM can choose to respond to gap fill if and only if it meets the following constraints:

It is not in the middle of processing any other gap fill requests.

It has all the required messages to service this gap fill request.

Multiple MEMs are configured in tier 2 in order to service simultaneous gap fill requests from several apps.

During a gap fill session:

If the gap-fill requesting app falls behind, MEM will terminate the connection to the app and make itself available to process other gap fill requests.

MEM will interleave between gap fill and reading MACH messages so as to ensure that it will not have a gap itself due to the gap fill processing. This interleaving must be based on a configurable number of milliseconds or number of gap fill writes.

If no tier 2 MEMs can service the request, the application will time out continue to request a fill from the tier 1 MEM's.

IF a Tier 2 MEM needs a gap fill:

MEM configuration will be as follows:

MEM Level 1: tier 2 MEMs subnet; max time to wait for gap fill.

MEM Level 2: tier 1 MEMs subnet; max time.

MEM Level N.

MEM will broadcast on each level subnet starting at level 1 and have a MEM in that level service it. If it times out waiting for gap fill, it will proceed to the next level for gap fill. It will continue doing this until there are no more levels and then it will start at level 1 again.

It will follow the same paradigm as an app requesting a gap fill from a tier 2 MEM.

MEM will optionally be configured to have the following features (that can potentially be used by MEMs, especially those that will be setup as tier 2):

Accept a command or a message with sequence number that will mark (or unmark) a flag for a message (indicated by the sequence number) that would indicate to the MEM to send a heartbeat message instead of the actual message while replaying that message. This will help fake a message to an application that would otherwise keep crashing on the same message every time it starts up and does a gap-fill.

If a Tier 1 MEM needs a gap fill:

A MEM will be classified as Tier 1 or Tier 2 based on its configuration. But every MEM will have the functionality mentioned above in the Tier 2 MEM gap fill.

Tier 1 MEM will be set up to request a MEM on the matching Engine server or the Matching engine (ME) itself to service it. Tier 1 MEMs will establish a SesM session with the matching engine at the time of start up. This will facilitate fast gap fills from the ME without the tier 1 MEM or ME having to take a hit due to intraday SesM session establishment.

MEM will preferably utilize the following features (that can potentially be used by MEMs, especially those that will be setup as tier 1):

The ability to disable it from processing any gap-fill requests.

The ability for the MEM to send a status message to the matching engine to let the matching engine know of the sequence number of the last message that has been successfully stored. The configuration will be set to zero if no such status message is needed. It will be set to N when a status message is needed and N will indicate the number of messages that needs to be consumed by MEM before it sends out a status message.

Failure recovery

Upon failure of MEM, the MEM store will be used as follows:

Upon hardware failure, a new MEM will be added on a new server. It will either rewind from another MEM or will be given a file to read off of. If it rewinds from another MEM, MEM will write to a new store. If it rewinds from a file copied from another MEM, any other subsequent messages that this MEM gets will have to be appended to that store. Once it finishes rewinding from either the file or another MEM, it can proceed to gap fill of the messages it may have lost on the stream.

Upon crash of a MEM, a MEM from tier 1 will rewind from a tier 2 and vice versa.

MEM is configured with a setting that will allow it to startup without rewinding. Such a MEM will just listen to the latest messages and start servicing gap fills of messages that it has in memory.

Upon session rollover:

if the MEM store is memory, all messages are discarded and a new store is started.

if the MEM store is file, the current store file is closed, a new one is opened and messages are started in that new file.

Start Up and Start of Session

Upon receipt of a start of session message, MEM will create a store for that session and start storing messages. MEM must not delete any old stores.

Application Design Considerations:

A 64 bit app in order to satisfy the memory storage requirement.

MACH is a scalable and lightweight multicast based protocol that allows a publisher to publish to many subscribers or "Edge Apps". It incorporates session level communication and a packet structure that allows subscribers to detect gaps and know the start and end of a message session.

MACH also works with MEMs to provide full reliable gap recovery of messages from the source.

MACH 1.0 Features:

Scalability and Low Latency:

MACH uses multicast that allows the publisher to publish once and all subscribers to receive it without any degraded performance with addition of new subscribers. This results in a lower latency compared to any fan-out based solutions.

Increased Performance:

MACH bunches multiple MACH packets into a single UDP packet that reduces I/O calls at both ends allowing for increased I/O efficiency and performance.

Clear Delineation from Application Layer:

MACH is designed to be used in conjunction with higher level application messaging protocols that specify the contents of the messages that MACH distributes. The MACH protocol layer is opaque to the higher-level messages permitting it to encapsulate and distribute an application message consisting of ASCII or binary data.

Link Failure Detection:

Uses frequent heartbeats to enable subscribers to proactively detect link or publisher failures.

Note that MACH protocol does not provide any delivery guarantee. In case the subscriber detects a gap, publisher side applications are generally designed to have a separate retransmission service or redundant feeds. Refer MEM for additional details of availability of such services.

MACH Protocol

Packets

MACH Publisher distributes application data in the form of MACH packets. MACH packets contain a unique sequence number and each MACH channel has a unique multicast group and/or port.

While the MACH protocol limits the maximum payload length to 65,535—(Header Size) bytes, publishing applications (example: Top of Market Feed) will keep the UDP packet size small and within the length of a standard MTU so as to get the best performance from the underlying infrastructure.

One or more MACH packets may be placed in the underlying Multicast MTU as the following two examples show:

Structure of the Payload with One MACH Packet Contained in a UDP Packet

TABLE 1

| MACH Header | Application Data |
|---|---|

Structure of the Payload with N (eg: 3) MACH Packets Contained in UDP Packet

One or more of such MACH messages can be buffered into a single UDP packet.

TABLE 2

| MACH Header | Application Data | MACH Header | Application Data | MACH Header | Application Data |
|---|---|---|---|---|---|

Messaging

Logon Request

Edge Apps need to inform the publisher (i.e., the ME 14) that they are present and what type a recovery behavior they want to implement: Full State recovery or No State recovery. This Logon Request allows edge apps to request the ME 14 reset their sequence number so new messages are not dropped due to a sequence number being less than the last received by the ME 14.

Logon Response

The publisher (i.e., ME 14) will respond with the last known sequence number received from an Edge App and the last sequence number the ME 14 has published.

Heartbeats

MACH uses heartbeat packets allowing subscribers to proactively detect link failures and Publisher failures. The Publisher must send a heartbeat packet anytime more than 1 second has passed since the Publisher last sent any data. This ensures that the subscribers will receive data on a regular basis. If the subscriber does not receive anything (neither data nor heartbeats) for an extended period of time (typically 3 heartbeat intervals), the link or the Publisher may be down.

SOS Request

Edge Apps use this message to request a Gap fill of messages when a gap is detected. MEMs receive messages and follow a protocol depending on the size of the gap. MEMs will either re-publish the gapped messages or reply with a SOS response requesting the Edge App to make a TCP connection to receive gapped messages.

SOS Response

Provided IP address and Port an Edge App can connect to receive gapped messages when the gap is larger than a configurable amount.

Application Message

Used when a normal application message needs to be transmitted.

Application Un-Sequenced Message

Used when an application message needs to be transmitted, the message is designed to be un-recoverable. (I.E. a Watch Dog, heart Beat message or "can I purge message")

Data Types

The following table describes the data tunes used in MACH protocol:

TABLE 3

| Data Type | Description |
| --- | --- |
| BinaryU | Unsigned, little-endian byte-ordered, binary encoded numbers |
| BinaryS | Signed, little-endian byte-ordered, binary encoded numbers |
| Alphanumeric | Each byte can contain characters or numbers. Left justified and space-padded on to the right |

Packet Header Structure

TABLE 4

| Field Name | Length | Data Type | Notes | | |
| --- | --- | --- | --- | --- | --- |
| Sequence Number | 4 | BinaryU | Sequence number of this data packet | | |
| Packet Length | 2 | BinaryU | Length of the packet. This includes the header and application data. | | |
| Packet Type | 1 | BinaryU | MACH protocol packet type. | | |
| | | | Type | Description | |
| | | | 0 | Heartbeat | |
| | | | 1 | Start of Session | |
| | | | 2 | End of Session | |
| | | | 3 | Application Data | |
| | | | 4 | Application Un-Sequence | |
| | | | 5 | Login Request | |
| | | | 6 | Logon Response | |
| | | | 7 | SOS Request | |
| | | | 8 | SOS Response | |
| Cookie | 1 | BinaryU | Request Response cookie used to identify proper response messages | | |
| Application ID | 4 | BinaryU | App ID of the sender or recipient | | |

Packet Type and Structure

Session Level Protocol Packets

Heartbeat

The message is just a header with no body.

Field Description:

TABLE 5

| Field Name | Length | Data Type | Notes |
| --- | --- | --- | --- |
| Sequence Number | 4 | BinaryU | set to value of the last packet sent out. |
| Packet Length | 2 | BinaryU | Length of the packet. This includes the header and application data. |
| Packet Type | 1 | BinaryU | 0—Heartbeat |
| Cookie | 1 | BinaryU | Not Used |
| Application ID | 4 | BinaryU | Not Used |

Login Request

Field Description:

TABLE 6

| Field Name | Length | Data Type | Notes |
| --- | --- | --- | --- |
| Sequence Number | 4 | BinaryU | Set to value of the last packet sent out. |
| Packet Length | 2 | BinaryU | Length of the packet. This includes the header and application data. |
| Packet Type | 1 | BinaryU | 5: "Logon Request" |
| Cookie | 1 | BinaryU | Not used |
| Application ID | 4 | BinaryU | Identifies the sender. |
| Sequence Number Reset | 1 | BinaryU | Flag set to '1' when requesting the receiver to set the next expect sequence number to 1 |

Login Response

Field Description:

TABLE 7

| Field Name | Length | Data Type | Notes |
| --- | --- | --- | --- |
| Sequence Number | 4 | BinaryU | Set to value of the last packet sent out. |
| Packet Length | 2 | BinaryU | Length of the packet. This includes the header and application data. |
| Packet Type | 1 | BinaryU | 6: "Logon Response" |
| Cookie | 1 | BinaryU | Not Used |
| Application ID | 4 | BinaryU | Identifies the recipient. |
| RX Sequence Number | 4 | BinaryU | Last Rx Seqnum engine received from app, 0 if none received. |
| TX Sequence Number | 4 | BinaryU | Last Tx Seqnum sent by engine |

SOS Request
Field Description:

TABLE 8

| Field Name | Length | Data Type | Notes |
|---|---|---|---|
| Sequence Number | 4 | BinaryU | Set to value of the last packet sent out. |
| Packet Length | 2 | BinaryU | Length of the packet. This includes the header and application data. |
| Packet Type | 1 | BinaryU | 7: "SOS Request" |
| Cookie | 1 | BinaryU | Not Used |
| Application ID | 4 | BinaryU | Not Used |
| First Sequence Number | 4 | BinaryU | Start of Gap to be filled |
| Last Sequence Number | 4 | BinaryU | End of Gap to be filled |

SOS Response
Field Description:

TABLE 9

| Field Name | Length | Data Type | Notes |
|---|---|---|---|
| Sequence Number | 4 | BinaryU | Set to value of the last packet sent out. |
| Packet Length | 2 | BinaryU | Length of the packet. This includes the header and application data. |
| Packet Type | 1 | BinaryU | 8: "SOS Response" |
| Cookie | 1 | BinaryU | Not Used |
| Application ID | 4 | BinaryU | Not Used |
| First Sequence Number | 4 | BinaryU | Start of Gap. |
| Last Sequence Number | 4 | BinaryU | End of Gap. |
| IP Address | 4 | BinaryU | IP address of Gap Fill process (MEM) |
| IP Port | 2 | BinaryU | IP Port of Gap Fill process (MEM) |

Application Message
Field Description:

TABLE 10

| Field Name | Length | Data Type | Notes |
|---|---|---|---|
| Sequence Number | 4 | BinaryU | Sequence number of this data packet |
| Packet Length | 2 | BinaryU | Length of the packet. Header and App Data |
| Packet Type | 1 | BinaryU | 3: "Application Message" |
| Cookie | 1 | BinaryU | Value to be return for in Ack Message |
| Application ID | 4 | BinaryU | Identifies the Sender. |
| Application Message | Variable | Any | 1 Application Message |

Application Un-Sequenced Message
Field Description:

TABLE 11

| Field Name | Length | Data Type | Notes |
|---|---|---|---|
| Sequence Number | 4 | BinaryU | Sequence number of this data packet |
| Packet Length | 2 | BinaryU | Length of the packet. Header and App Data |
| Packet Type | 1 | BinaryU | 4: "Non-Sequenced Application Message" |
| Cookie | 1 | BinaryU | Not used as Non-Sequence messages are not "Acked" |
| Application ID | 4 | BinaryU | Identifies the Sender. |
| Application Message | Variable | Any | 1 Application Message |

Figure 11:
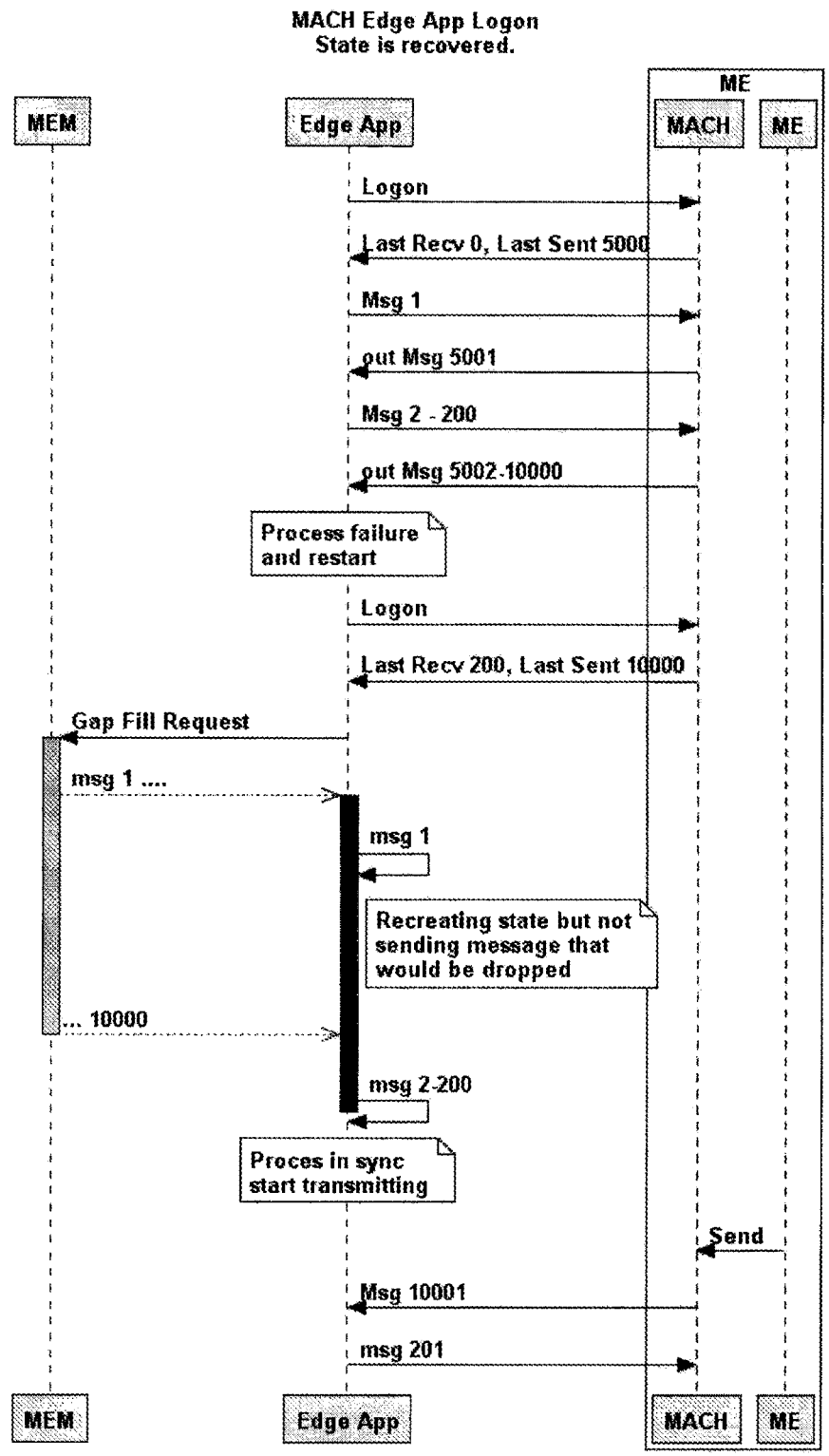
FIG. 11 is a flow diagram showing MACH Edge App login in which a state is recovered.

A message flow for an Edge App Logon, to Maintain State, is shown in FIG. 11. FIG. 11 illustrates how an edge app recovers from a failure by logging into the matching engine (ME) 14 to get the last sequence # emitted on the wire by both the ME 14 and the previous session of the Edge App. As shown in the figure, a MACH Edge App Logon State is recovered by a sequence of messages between the ME 14, the Edge App and MEM. When gap fill is required, after a process failure and restart, messages are sent between the Edge App and the MEM to recreate the state, without sending messages that would be dropped.

Figure 12:
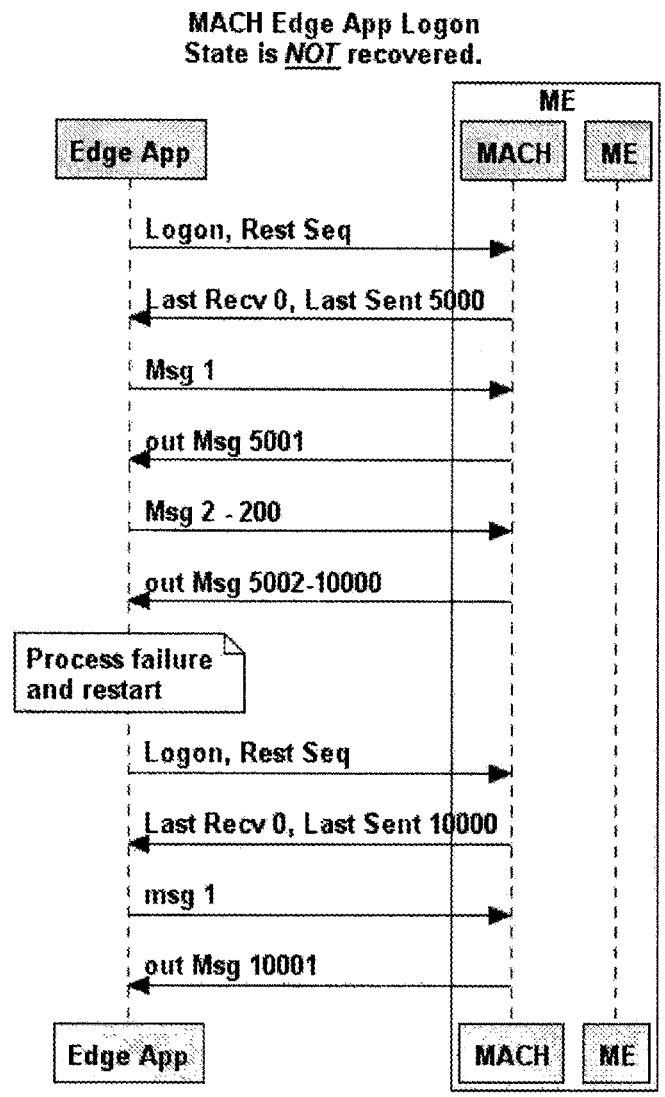
FIG. 12 is a flow diagram showing MACH Edge App login in which a state is not recovered.

A message flow for Edge App Logon, State is Not Maintained is shown in FIG. 12. Applications that do not need to reestablish their state, such as the WDP 48, simply log into the matching engine ME 14 to get the matching engine 14's last sequence #. As shown in the figure, even after a process failure and restart, no gap fill request is generated to recreate the state.

Figure 13:
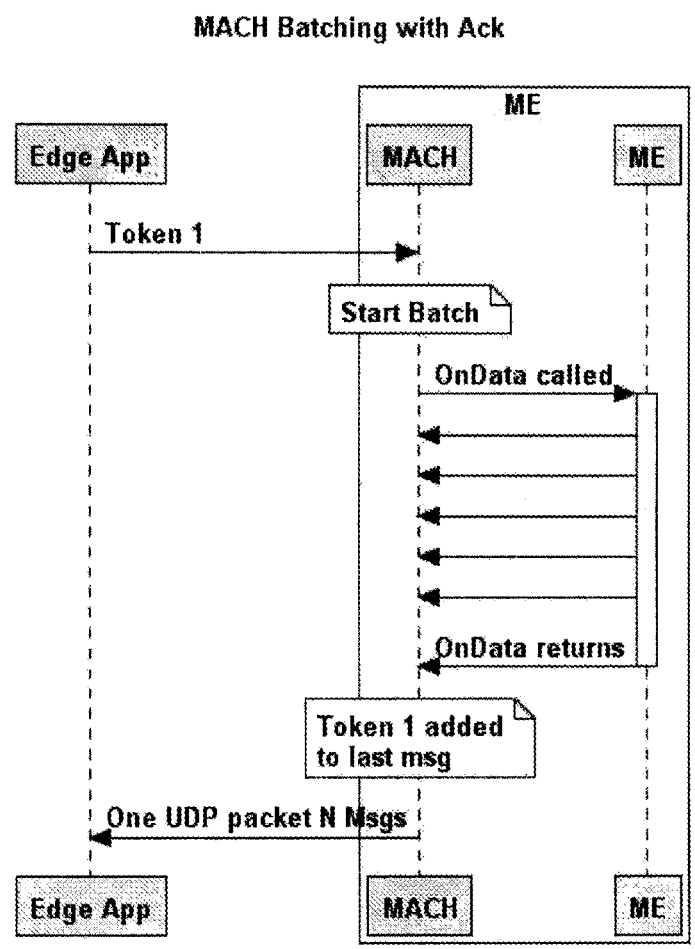
FIG. 13 is a flow diagram that shows MACH batching with ACK.

A message flow for Batching with Ack is shown in FIG. 13. As shown in the figure, The Edge App sends Token 1 to the MACH interface of the ME 14, and a batch is started. OnData is called and returned, a Token 1 is added to last msg, and one UDP packet with N Msgs is returned to the Edge app.

Figure 14:
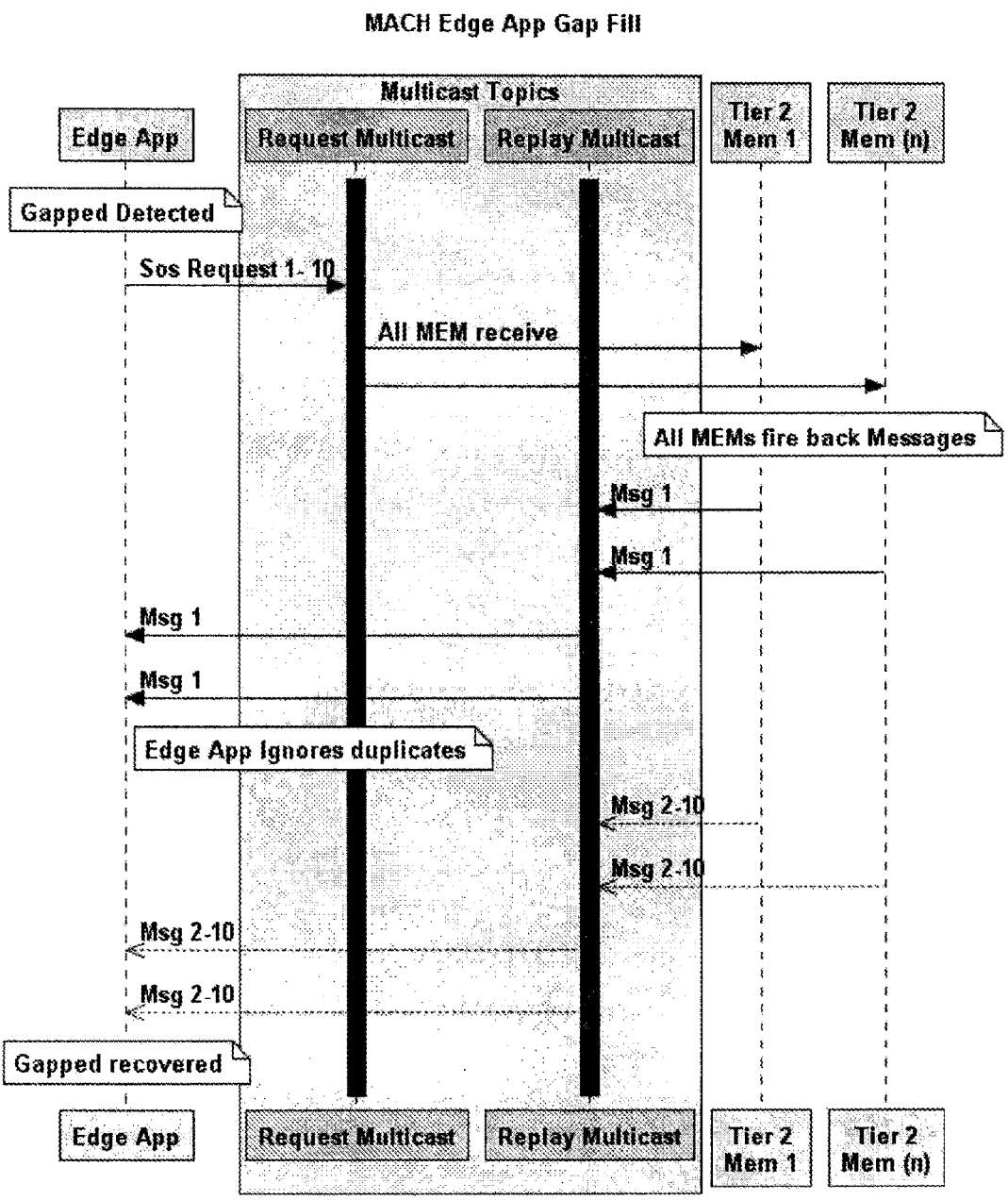
FIG. 14 is a flow diagram that shows MACH Edge App gap fill.

A message flow for Edge App Gap Recovery Small Message Count is shown in FIG. 14 for filling a gap on the MACH stream. As shown in the figure, the Edge App detects a gap and sends SOS Requests 1-10, and these are passed along so that all Tier 2 MEMs receive the requests. In response, all MEMs fire back messages, which messages are passed along to the Edge app. Duplicates may occur, but are ignored by the Edge App. Based on the received messages, the Edge App can recover the gap.

Figure 15:
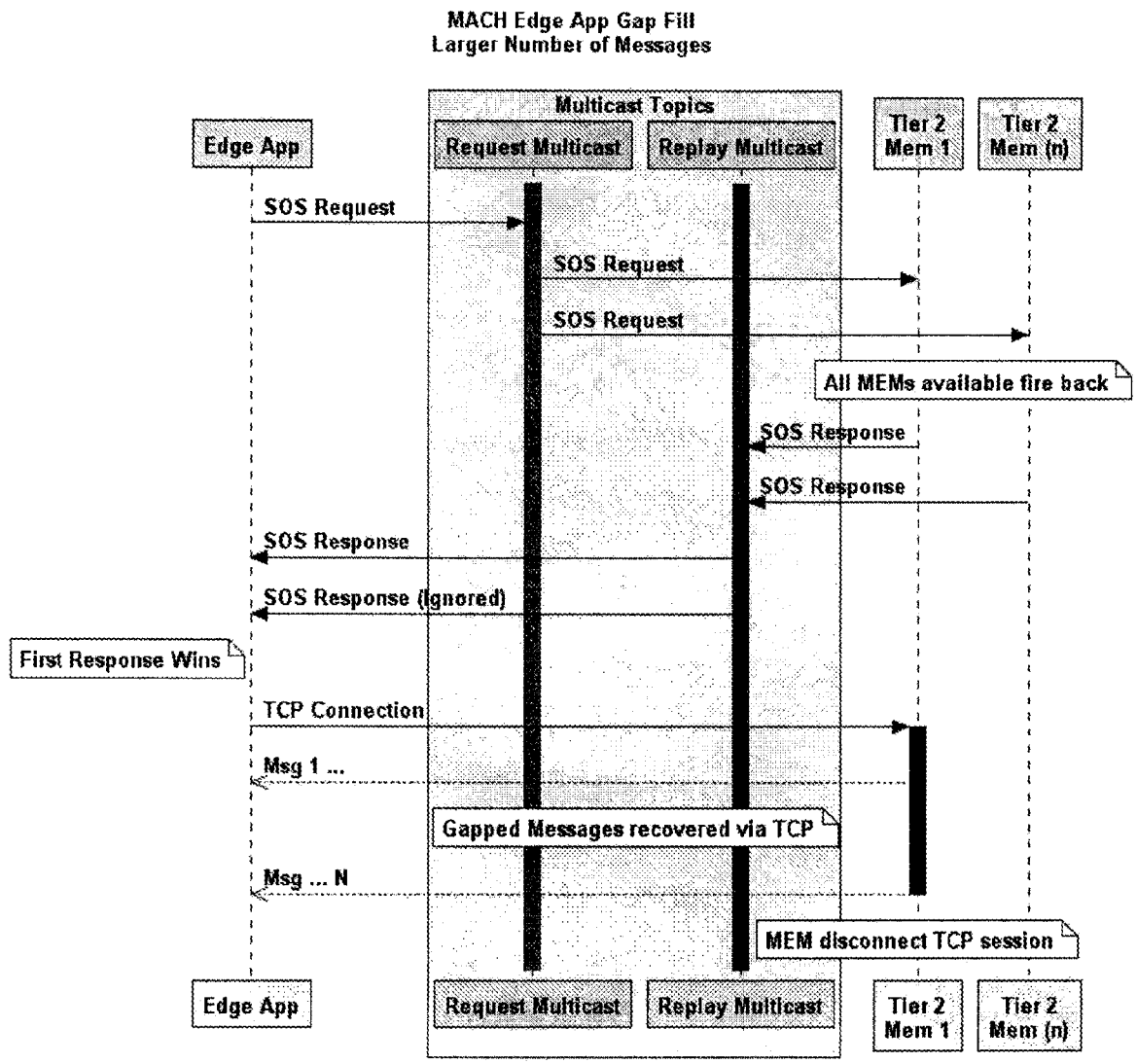
FIG. 15 is a flow diagram that shows MACH Edge App gap fill for a large number of messages.

A message flow for Edge App Gap Recovery Large Message Count is shown in FIG. 15 to fill a gap in messages on the MACH stream. As shown in that figure, gap messages are recovered via TCP instead of by MACH. An SOS Request is sent to Request Multicast of the Multicast Topics and the SOS messages are duplicated and sent to each of Tier 2 MEM 1 through Tier 2 MEM (n). In response, all available MEMs fire back SOS responses to the Replay Multicast of the Multicast Topics, which relays SOS responses to the Edge app. Duplicate responses are ignored and the first response "wins." This triggers a TCP connection to be formed between the Edge app and the Tier 2 MEM 1, which sends the gapped messages 1 . . . N, via TCP, to the Edge app. Once all the messages have been recovered, the MEM disconnects the TCP session.

Figure 16:
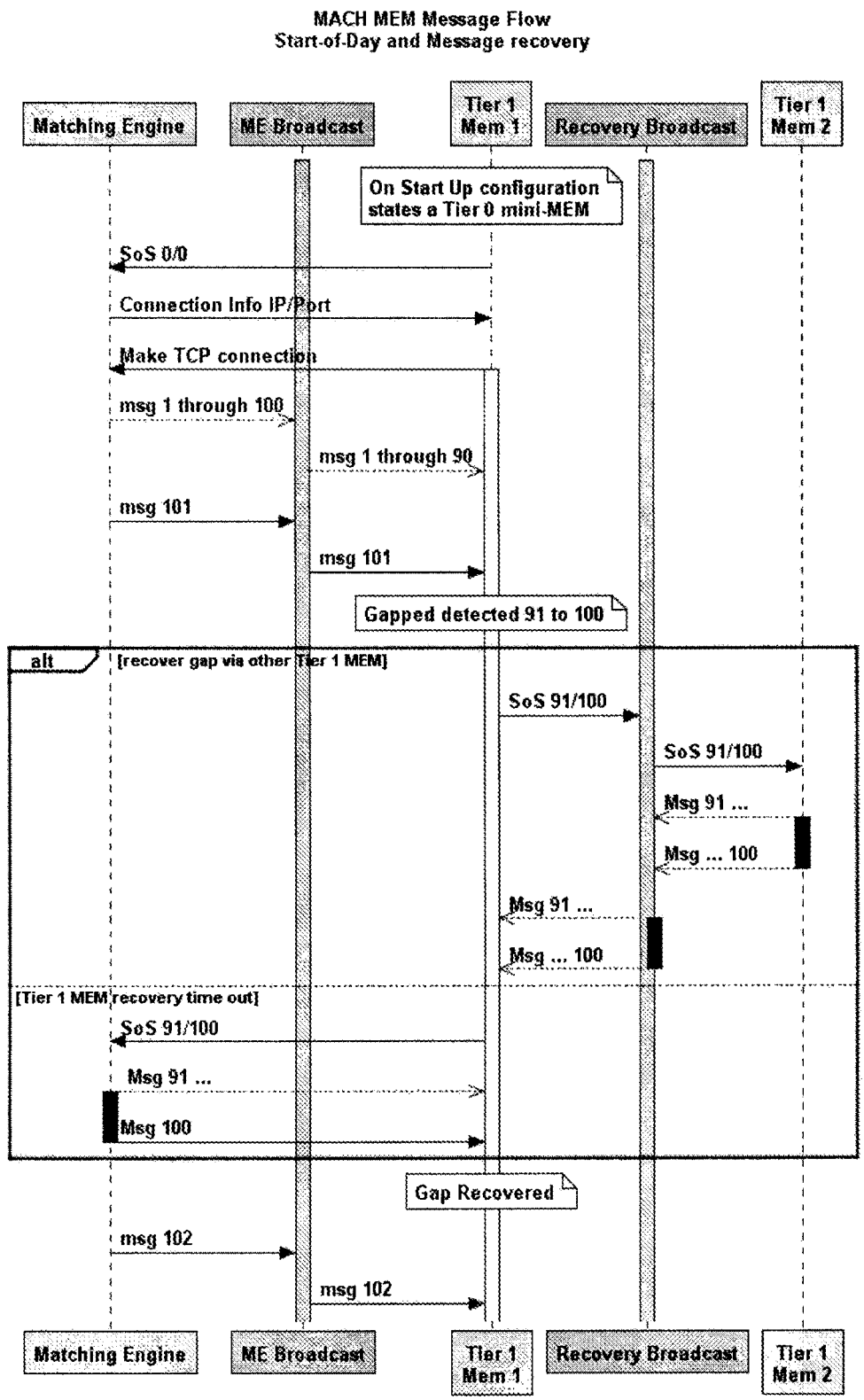
FIG. 16 is a flow diagram that shows MACH MEM message flow for Start of Day and message recovery.

FIG. 16 illustrates a Tier 1 MEM Start of Day and Message Flow and shows how the MEMs recover state from the matching engine's own local message store, the mini-MEM. As shown in the figure, on start up configuration states a mini-MEM, the ME's local message store. An SoS 0/0 is sent to the matching engine, which replies with a Connection info IP/Port. Then, the Tier 1 MEM makes a TCP connection with the matching engine. The matching engine sends msg 1 through 100 to the ME Broadcast. However, in the illustrated example, only msgs 1 through 90 reach the Tier 1 MEM 1. Upon a further message 101 being sent to the Tier 1 MEM 1, the MEM detects a gap of msgs 91-100 and initiates the series of transactions shown in the box in the figure to recover the gap via another Tier 1 MEM. At the conclusion of the illustrated series of messages, msgs 91-100 reach the Tier 1 MEM 1, to recover the gap. Further messages ensue thereafter in normal fashion.

Figure 17:
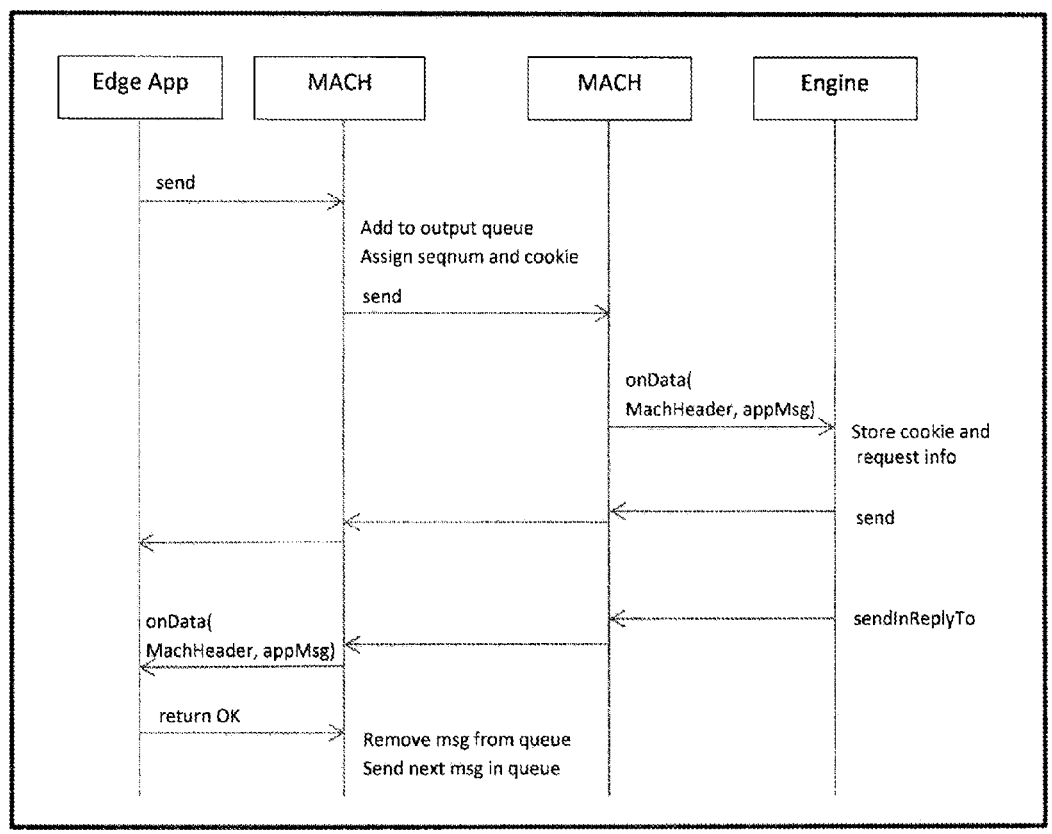
FIG. 17 is a flow diagram that shows MACH mediate ACK.

FIG. 17 is a sequence diagram of an edge app send—MACH mediated ack, showing messages sent from an Edge app to the ME's command port, i.e., the port for receiving MCAST messages on the system bus.

In the diagram, the Edge app calls MACH to send a message to ME 14. The MACH adds the message to the output queue. If head of queue, it assigns message a sequence number and cookie and invokes system call to send the message. MACH on the matching engine side receives message, verifies the sequence number, and invokes the matching engine's on Data callback. Then, the matching engine stores request and associated cookie.

The matching engine then sends back one or more record updates—these do not ACK the original request. When the transaction is done, the matching engine sends ACK with sendInReplyTo. The call includes the cookie for the original request. MACH on the edge app side receives this message and invokes edge app's on Data method. If edge app returns OK, MACH uses cookie to mark the head of the output queue as ACKed.

While certain configurations of structures have been illustrated for the purposes of presenting the basic structures of the present invention, one of ordinary skill in the art will appreciate that other variations are possible which would still fall within the scope of the appended claims.

The invention claimed is:

1. A method for trading quotes relating to financial instruments received from quoting firms in a computerized trading system having a plurality of independent trading environments, the method comprising:
   providing a plurality of independent trading environments, wherein providing each independent trading environment comprises:
      providing a communication network;
      providing a matching engine executed by a server, wherein the matching engine accesses a shared memory;
      providing a plurality of interface applications, executed by the server, wherein each interface application is associated with a particular quoting firm; and
      assigning areas of the shared memory to each of the plurality of interface applications;
   receiving quotes from the plurality of quoting firms at their respective interface applications, wherein the received quotes comprise data representing at least one of offers to buy and offers to sell a financial instrument;
   placing, by the interface applications, the quotes received from the respective quoting firms in their respective assigned areas of the shared memory;
   matching, by the matching engine, the received quotes placed in the areas of the shared memory, wherein the matching comprises:
      polling, by the matching engine, a first area of memory to find a quote or quotes;
      processing the quote or quotes in the first area, the processing including searching for a matching contraside interest, allocating the resulting matching interest according to at least one allocation rule, and executing the quote according to the allocating; and
      repeating said polling and processing for each area of the shared memory in a round robin manner; and
   the matching engine, upon completion of polling all areas of the shared memory, checking a network port of the matching engine to receive messages from the network, the messages comprising at least one of data representing a state of a financial instrument market and data representing incoming orders for financial instruments, before repeating said matching procedure.

2. The method according to claim 1, wherein the messages received by the matching engine over the network comprise orders from FIX order interface.

3. The method according to claim 1, further comprising the matching engine, after processing a quote or quotes in an area of the shared memory, sending over the network, using a multicast protocol, information relating to the processing of the quote.

4. The method according to claim 3, wherein the matching engine sends the information relating to the processing of the quote to a high bandwidth bus of the independent trading environment.

5. The method according to claim 3, wherein the independent trading environment includes applications configured to forward top of the market data, based on the processing of the quotes, to parties outside of the independent trading environment.

6. The method according to claim 5, wherein the parties outside the independent trading environment include OPRA.

7. The method according to claim 3, wherein the independent trading environment includes a message retrieval application that records all messages sent between the matching engine and applications present in the independent trading environment, the method further comprising:
   in response to a request from an application to fill a gap in messages, the message retrieval application provides the requesting application with the messages necessary to fill the gap.

8. The method according to claim 1, further comprising the matching engine receiving, from data sources outside of the trading system, market data, and modifying processing of the quotes on the basis of the received market data.

9. A computerized electronic trading platform for performing trading of one or more types of financial instruments, the trading platform comprising:
   a plurality of independent trading environments, each executed by a server comprising a processor and shared memory, each independent trading environment including:
      a communication network;
      a plurality of instances of an interface application executed by the processor of the server and configured to receive quotes, the plural instances of the interface application each being associated with a particular quoting firm, the received quotes comprising data representing at least one of offers to buy and offers to sell the financial instruments, the plurality of instances of the interface application configured to write the quotes to the shared memory on the server, in respective areas of the shared memory assigned to each of the plurality of interface applications; and
      a matching engine executed by the processor of the server and configured to a perform a matching procedure comprising:
      polling a first area of memory to find a quote or quotes;
      processing the quote or quotes in the first area, the processing including searching for any matching contraside interest, allocating any resulting matching interest according to at least one allocation rule, and executing the quote according to the allocating; and
      repeating said polling and processing for each area of the shared memory in a round robin manner,
      wherein the matching engine, upon completion of polling all areas of the shared memory, checks a network port of the matching engine to receive messages from the network, the messages comprising at least one of data representing a state of a financial instrument market and data representing incoming orders for financial instruments, before repeating said matching procedure.

10. The computerized electronic trading platform of claim 9, wherein:
   each interface application is configured to receive quotes from a particular quoting firm, and
   the interface applications is configured to place quotes received from respective quoting firms in areas of the shared memory each reserved for quotes from a particular respective one of the quoting firms.

11. The computerized electronic trading platform of claim 9, wherein the messages received by the matching engine over the network comprise orders from FIX order interface.

12. The computerized electronic trading platform of claim 9, wherein the matching engine is configured, after processing a quote or quotes in an area of the shared memory, to send over the network, using a multicast protocol, information relating to the processing of the quote.

13. The computerized electronic trading platform of claim 12, wherein the matching engine is configured to send the information relating to the processing of the quote to a high bandwidth bus of the independent trading environment.

14. The computerized electronic trading platform of claim 9, wherein the independent trading environment includes applications configured to forward top of the market data, based on the processing of the quotes, to parties outside of the independent trading environment.

15. The computerized electronic trading platform of claim 14, wherein the parties outside the independent trading environment include OPRA.

16. The computerized electronic trading platform of claim 9, wherein the independent trading environment includes a message retrieval application that records all messages sent between the matching engine and applications present in the independent trading environment, wherein, in response to a request from an application to fill a gap in messages, the message retrieval application is configured to provide the requesting application with the messages necessary to fill the gap.

17. The computerized electronic trading platform of claim 9, wherein the matching engine is configured to receive, from data sources outside of the trading system, market data, and modifying processing of the quotes on the basis of the received market data.

18. The computerized electronic trading platform of claim 9, wherein:
   trading in the financial instruments is divided among the independent trading environments on the basis of symbols associated with the traded financial instruments, and
   each independent trading environment is configured to process quotes from one or more trading symbols out of all the trading symbols tradable on the trading system.

19. A non-transitory computer-readable medium storing instructions for execution by a processor to cause the processor to execute a method for trading quotes relating to financial instruments received from quoting firms in a computerized trading system having a plurality of independent trading environments, each of the independent trading environments having a matching engine executed by a server, and plural instances of an interface application executed by the server, each interface application being associated with a particular quoting firm, the method comprising:
   receiving quotes from the plurality of quoting firms at their interface application applications in respective ones of the plurality of independent trading environments, wherein the received quotes comprise data representing at least one of offers to buy and offers to sell a financial instrument;
   placing, by the interface applications, the quotes received from the respective quoting firms in their respective assigned areas of a shared memory;
   matching, by the matching engine, the received quotes placed in the areas of the shared memory, wherein the matching comprises:
     polling, by the matching engine, a first area of memory to find a quote or quotes;
     processing of the quote or quotes in the first area, the processing including searching for any matching contraside interest, allocating any resulting matching interest according to at least one allocation rule, and executing the quote according to the allocating; and
     repeating said polling and processing for each area of the shared memory in a round robin manner; and
   the matching engine, upon completion of polling all areas of the shared memory, checking a network port of the matching engine to receive messages from the network, the messages comprising at least one of data representing a state of a financial instrument market and data representing incoming orders for financial instruments, before repeating said matching procedure.

20. The non-transitory computer-readable medium according to claim 19, wherein the messages received by the matching engine over the network comprise orders from FIX order interface.

21. The non-transitory computer-readable medium according to claim 19, the method further comprising the matching engine, after processing a quote or quotes in an area of the shared memory, sending over the network, using a multicast protocol, information relating to the processing of the quote.

22. The non-transitory computer-readable medium according to claim 21, wherein the matching engine sends the information relating to the processing of the quote to a high bandwidth bus of the independent trading environment.

23. The non-transitory computer-readable medium according to claim 21, wherein the independent trading environment includes applications configured to forward top of the market data, based on the processing of the quotes, to parties outside of the independent trading environment.

24. The non-transitory computer-readable medium according to claim 23, wherein the parties outside the independent trading environment include OPRA.

25. The non-transitory computer-readable medium according to claim 21, wherein the independent trading environment includes a message retrieval application that records all messages sent between the matching engine and applications present in the independent trading environment, the method further comprising:
   in response to a request from an application to fill a gap in messages, the message retrieval application provides the requesting application with the messages necessary to fill the gap.

26. The non-transitory computer-readable medium according to claim 19, the method further comprising the matching engine receiving, from data sources outside of the trading system, market data, and modifying processing of the quotes on the basis of the received market data.

* * * * *